United States Patent
Sharma et al.

(10) Patent No.: US 11,343,584 B2
(45) Date of Patent: May 24, 2022

(54) SYSTEM AND METHOD FOR ACCELERATED VIDEO STARTUP

(71) Applicant: AT&T Intellectual Property I, L.P., Atlanta, GA (US)

(72) Inventors: Rachit Sharma, Redondo Beach, CA (US); Constance Goshgarian, Rancho Palos Verdes, CA (US); Pankaj Sharma, Cypress, CA (US); Emir Halepovic, Somerset, NJ (US); Albert Chan, Monterey Park, CA (US); Gowrishankar Natarajan, Torrance, CA (US); Atanu Basak, Torrance, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/875,753

(22) Filed: May 15, 2020

(65) Prior Publication Data

US 2021/0219025 A1   Jul. 15, 2021

Related U.S. Application Data

(60) Provisional application No. 62/959,872, filed on Jan. 10, 2020.

(51) Int. Cl.
*H04N 21/6334* (2011.01)
*H04N 21/433* (2011.01)
*H04N 21/472* (2011.01)
*H04N 21/4627* (2011.01)

(52) U.S. Cl.
CPC ... *H04N 21/63345* (2013.01); *H04N 21/4331* (2013.01); *H04N 21/4627* (2013.01); *H04N 21/47217* (2013.01)

(58) Field of Classification Search
CPC ........... H04N 21/2187; H04N 21/4532; H04N 21/23439; H04N 21/25875; H04N 21/458; H04N 21/26258
See application file for complete search history.

(56) References Cited

U.S. PATENT DOCUMENTS

| | | | |
|---|---|---|---|
| 6,425,129 B1 * | 7/2002 | Sciammarella | H04N 21/84 725/38 |
| 9,736,730 B2 | 8/2017 | Halepovic et al. | |
| 10,182,098 B2 | 1/2019 | Natarajan et al. | |
| 10,417,729 B2 | 9/2019 | Taylor et al. | |
| 2004/0111741 A1 | 6/2004 | Depietro | |
| 2004/0268400 A1 | 12/2004 | Barde et al. | |
| 2006/0020973 A1 | 1/2006 | Hannum et al. | |

(Continued)

*Primary Examiner* — Jason Salce
(74) *Attorney, Agent, or Firm* — Guntin & Gust, PLC; Ralph Trementozzi

(57) ABSTRACT

Aspects of the subject disclosure may include, for example, identifying unselected video content items and preconfiguring playback views for unselected video content items. During a warm-up phase, access to the unselected video content items is precoordinated individually with a separate video player, manifests and license/key are retrieved in anticipation for possible selection for playback. Subsequent selection of one of the unselected video content items initiates playback responsive to selection without repeating any of the preconfiguring, preauthorizing or fetching. Other embodiments are disclosed.

20 Claims, 14 Drawing Sheets

(56) References Cited

U.S. PATENT DOCUMENTS

| | | |
|---|---|---|
| 2008/0244665 A1 | 10/2008 | Bowen et al. |
| 2008/0253693 A1* | 10/2008 | Chu ................... G16H 30/20 |
| | | 382/305 |
| 2012/0170906 A1 | 7/2012 | Soroushian et al. |
| 2014/0003516 A1 | 1/2014 | Soroushian |
| 2014/0026052 A1* | 1/2014 | Thorwirth .......... H04L 65/4084 |
| | | 715/721 |
| 2014/0082661 A1* | 3/2014 | Krahnstoever ............................ |
| | | H04N 21/234336 |
| | | 725/32 |
| 2016/0191664 A1* | 6/2016 | Balakrishnan ...... H04L 67/2857 |
| | | 709/203 |
| 2016/0212487 A1* | 7/2016 | Rao .................. H04N 21/47205 |
| 2017/0171590 A1 | 6/2017 | Ma et al. |
| 2017/0257408 A1 | 9/2017 | Gaunt et al. |
| 2020/0204861 A1* | 6/2020 | Loheide ............. H04N 21/8146 |
| 2021/0044850 A1* | 2/2021 | Gala .................... H04L 65/601 |

\* cited by examiner

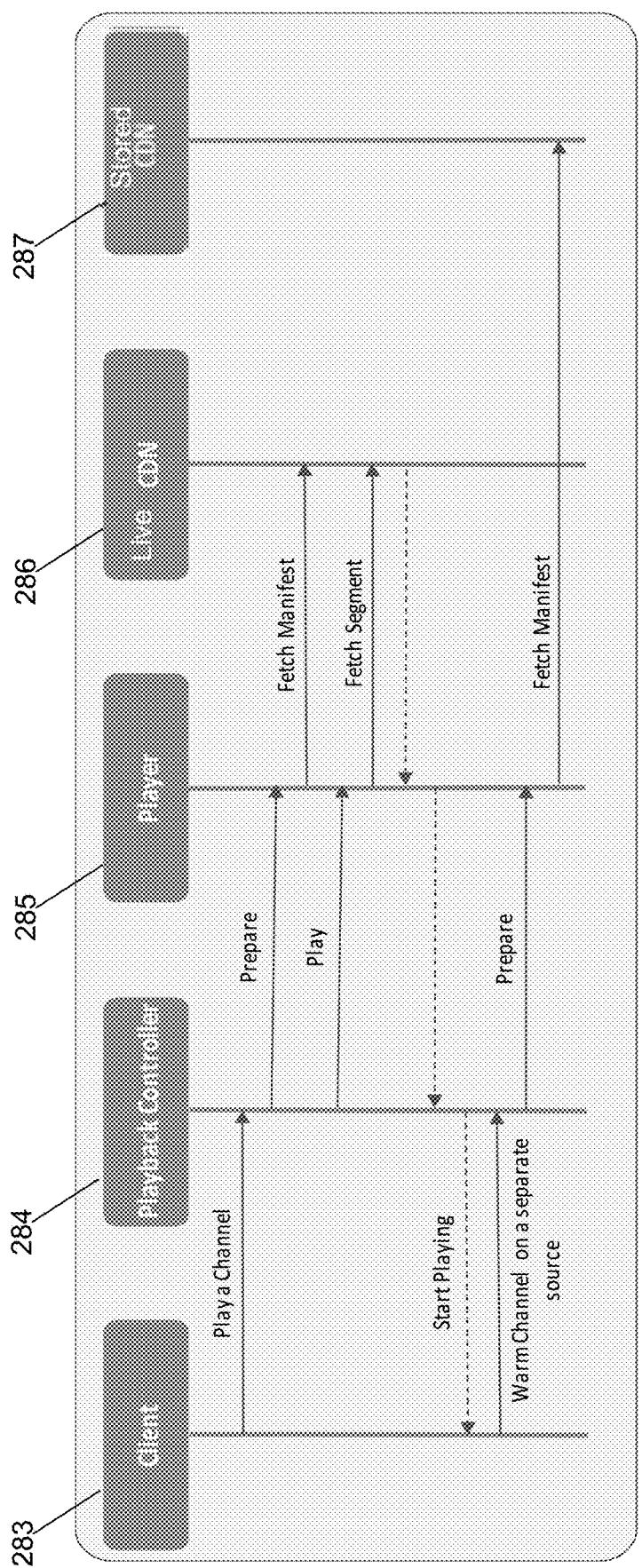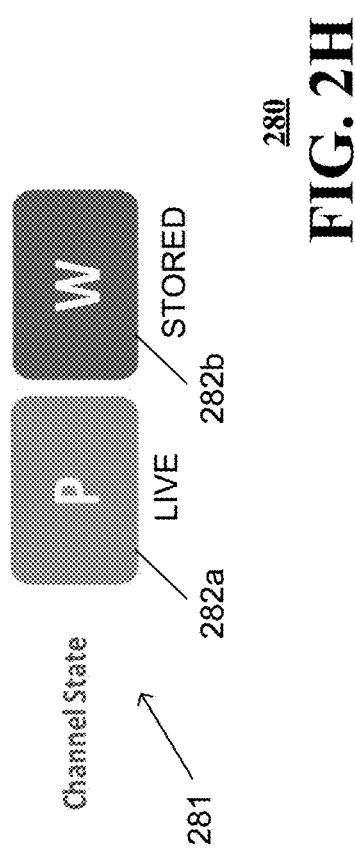
FIG. 2H

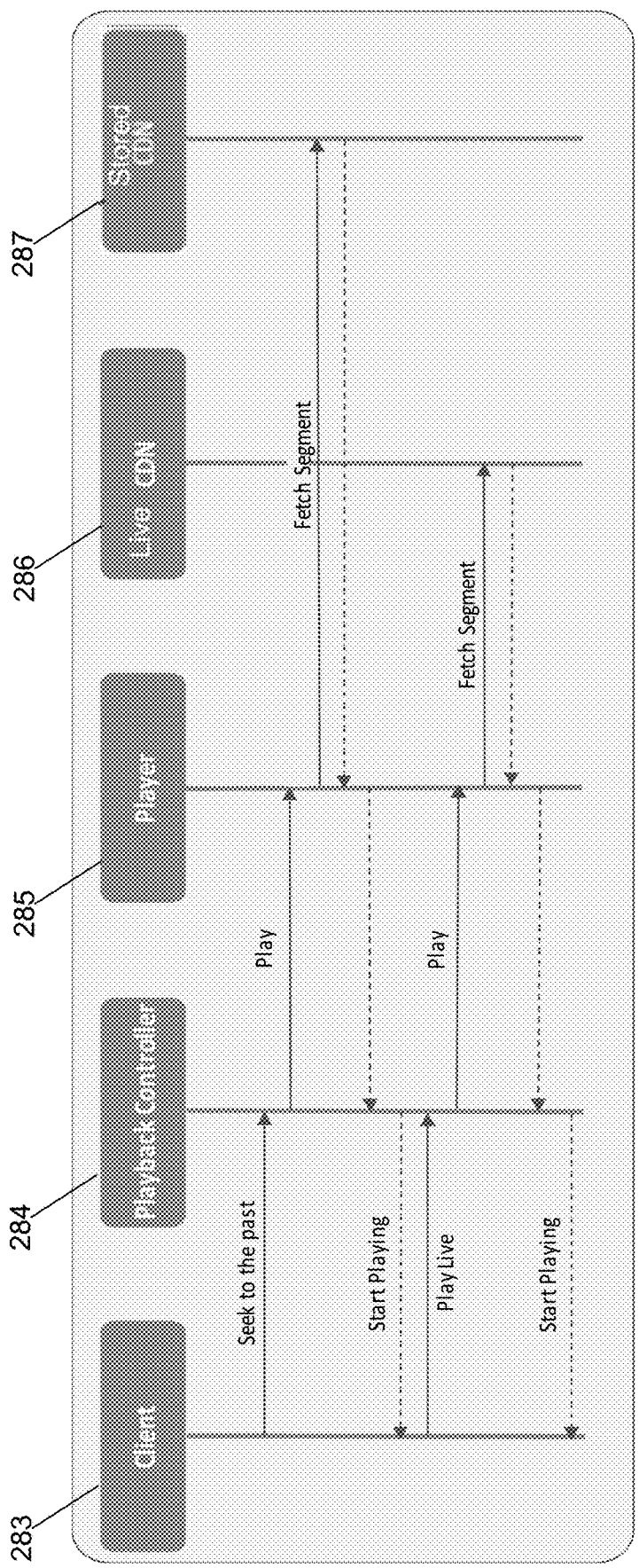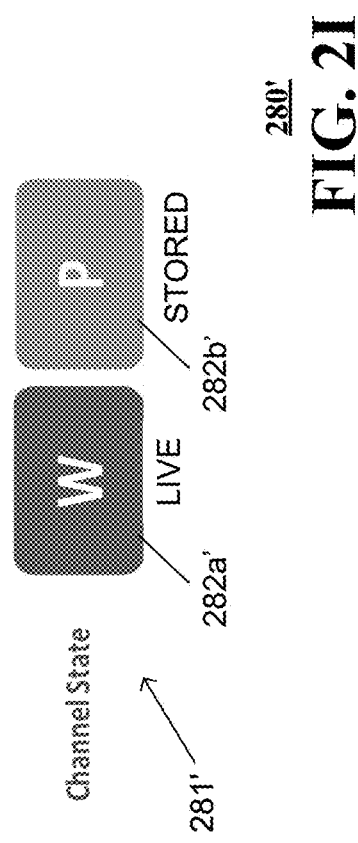
FIG. 2I

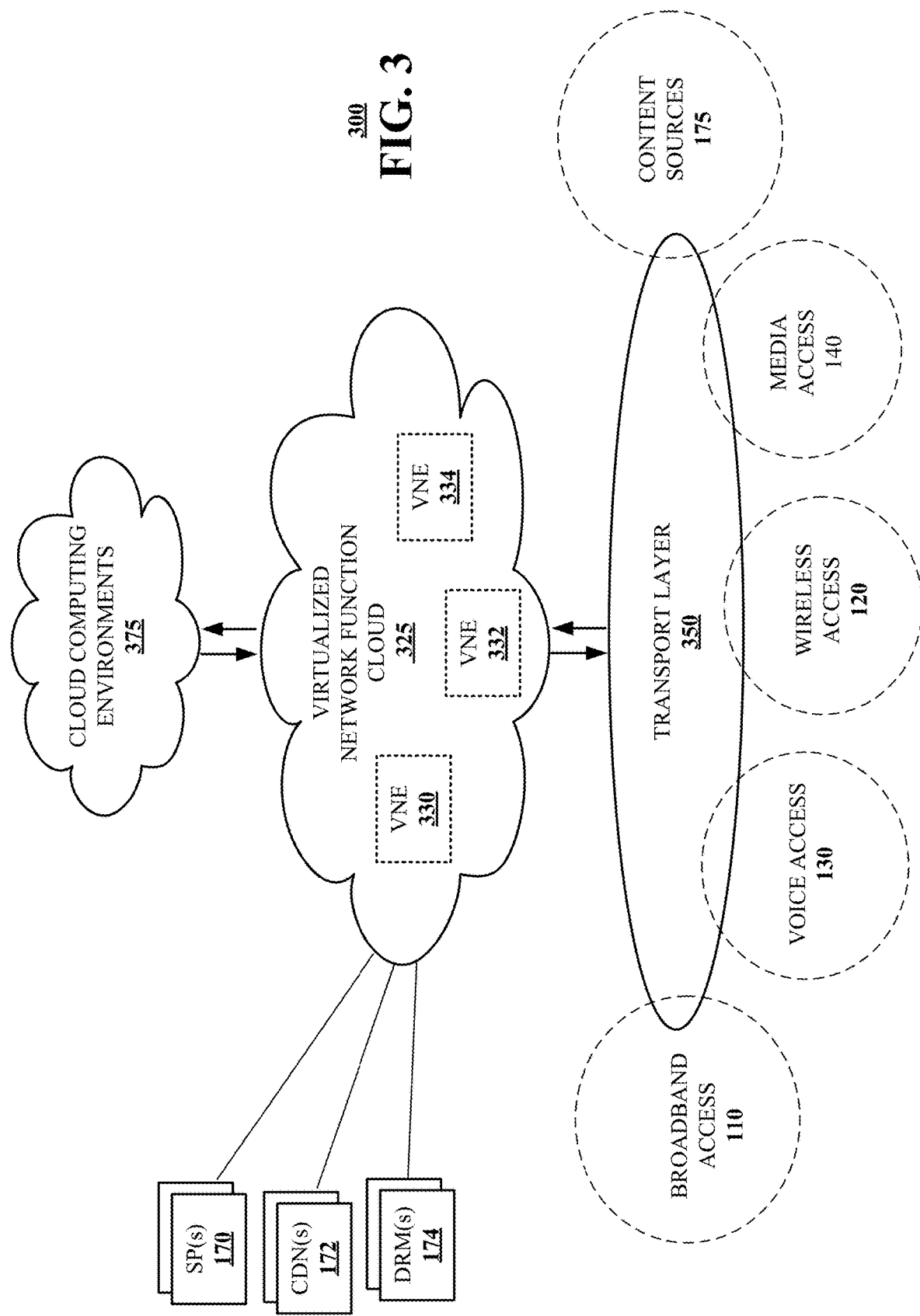

SYSTEM AND METHOD FOR ACCELERATED VIDEO STARTUP

CROSS-REFERENCE TO RELATED APPLICATION(S)

The present application claims the benefit of priority to U.S. Provisional Application No. 62/959,872 filed on Jan. 10, 2020, which is hereby incorporated herein by reference in its entirety.

FIELD OF THE DISCLOSURE

The subject disclosure relates to a system and method for accelerated video startup.

BACKGROUND

Video players process video content for display on user devices. Such processing can include ascertaining authorized access, downloading manifest and/or video segments, fetching license/key, decoding and/or rendering of the video content. Display may occur on any of a variety of display devices, such as televisions, smart televisions, computers, tablet devices, smart phones, video game consoles, augmented and/or virtual reality displays, displays on a home appliance, and the like. The video content may be obtained from a content delivery network, e.g., video on demand, streaming media, a web service, the Internet, a file server, a local storage device, e.g., a hard drive, and/or a digital video recorder. In at least some applications the video content may be copyright protected and/or secured, e.g., encrypted and/or otherwise scrambled, to prevent unauthorized access.

BRIEF DESCRIPTION OF THE DRAWINGS

Reference will now be made to the accompanying drawings, which are not necessarily drawn to scale, and wherein:

FIG. 2H is a block diagram illustrating an example non-limiting embodiment of a media processing system adapted for live media content item warm-up.

FIG. 2I is a block diagram illustrating an example non-limiting embodiment of a media processing system adapted for live media content item warm-up.

FIG. 3 is a block diagram illustrating an example, non-limiting embodiment of a virtualized communication network in accordance with various aspects described herein.

DETAILED DESCRIPTION

Figure 1:
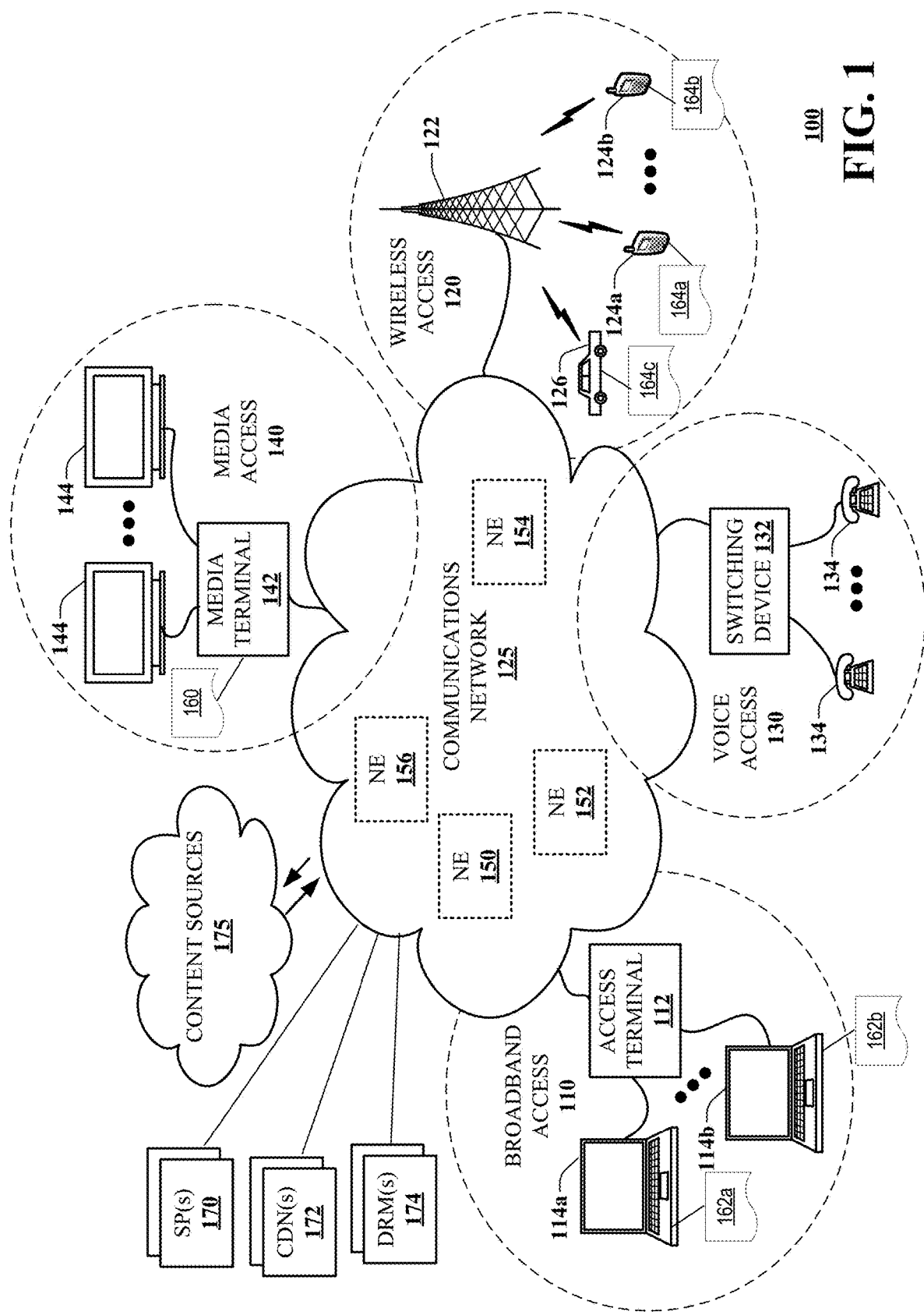
FIG. 1 is a block diagram illustrating an exemplary, non-limiting embodiment of a communications network in accordance with various aspects described herein.

The subject disclosure describes, among other things, illustrative embodiments for dividing video playback start workflow into two parts, wherein the first portion encompassing majority of tasks is implemented during a so-called warm-up phase and a second portion just starts the playback. Most of the tasks of the playback start workflow being accomplished in the warm-up phase in advance, on playing a warmed-up video the playback start with significantly reduced startup time, e.g., any delay being largely imperceptible—nearly instantaneous with no wait time for video to start. Other embodiments are described in the subject disclosure.

One or more aspects of the subject disclosure include a device, having a processing system including a processor and a memory that stores executable instructions that, when executed by the processing system, facilitate performance of operations. The operations include identifying several unselected video content items with high probability of being selected for next playback, wherein the identifying occurs while a video player is providing a selected video content item for presentation via a display device. In some embodiments, the operations include identifying several unselected video content items according to a determined probability of their of being selected for next playback. A separate player may be assigned to each of the plurality of unselected video content items. Playback views are preconfigured for the plurality of unselected video content items, while the video player is presenting the first selected video content item. Access to the plurality of unselected video content items is preauthorized, the manifests are fetched for the number of unselected video content items, and decoding key is fetched for each of the unselected video content, all done simultaneously while the video player is presenting the first selected video content item. At least some of the manifests may be fetched continuously. A subsequent selection of one of the number of unselected video content items initiates playback responsive to selection, without repeating any of the pre-configuring, preauthorizing, key acquiring and initial manifest fetching.

One or more aspects of the subject disclosure include a process that includes identifying, by a processing system including processor, a number of unselected video content items, the unselected video content items not yet having been selected for playback. The identifying of the unselected video content items may include predictive modeling. Playback views for the plurality of unselected video content items are preconfigured, by the processing system, and access to the number of unselected video content items is preauthorized, by the processing system. Several manifests for the number of unselected video content items are fetched by the processing system. A decoding key for each of the unselected video content is fetched by the processing system, wherein a subsequent selection of one of the unselected video content items initiates playback responsive to selection, without repeating any of the preconfiguring, preauthorizing or fetching.

One or more aspects of the subject disclosure include a non-transitory, machine-readable medium, including executable instructions that, when executed by a processing system including a processor, facilitate performance of operations. The operations include identifying an unselected video content item, the unselected video content item not yet having been selected for playback by a media processor, preconfiguring a playback view for the unselected video content item, preauthorizing access to the unselected video content item, and fetching manifests for the unselected video content item. A subsequent selection of the unselected video content item initiates playback responsive to selection, without repeating any of the preconfiguring, preauthorizing or fetching.

Media processing systems and/or devices may be adapted to process media content items, such as video and/or audio, for presentation at a user device. In at least some embodiments, the media processors include one or more media players adapted to render media content items for display on a display device. One media processing device may include one or more media players accessible to system operations and/or applications implemented by the media processing system. In at least some embodiments, the media player(s) operate in whole or in part according to one or more client applications or "apps." The apps can be adapted to process media content items, such as video and/or audio, for presentation at a media processor, such as a user device. An app may include a media player. Alternatively or in addition, and app may access a media player external to the application, e.g., via an interface, such as an application programming interface (API). Media processors include, without limitation, smart televisions, workstation computers, laptop computers, tablet devices, gaming systems, smart telephones, and any device adapted to engage in machine-to-machine communications, sometimes referred to as machine type communications.

The media content, e.g., media files, and/or streaming media may be obtained from a media source, such as a content delivery network, e.g., a video on demand service, a streaming media service, a web service, e.g., web TV, the Internet, a file server, a local storage device, e.g., a hard drive, and/or a digital video recorder. The media content may include pre-recorded media content, live media content, and/or combinations thereof. In some embodiments, the client app includes a media player to process the media content for presentation at the user. Alternatively or in addition, the client app accesses a separate media player, e.g., using APIs. The client app may provide a user interface, e.g., a menu, adapted to allow a user to select media content, e.g., from a catalog, a streaming channel, a local source, and the like. The menu may be further adapted to facilitate entry of user credentials, as may be necessary for accessing one or more of a media player application, a media service and particular media content items. In at least some embodiments, the user interface is adapted to facilitate user selection of a display device or multiple display devices and/or a display frame or frames, e.g., a window within a window environment.

The client app may be further adapted to facilitate one or more of accessing any selected media content items, authorization for such access and/or presentation and presentation at the selected device, e.g., within a predetermined window or display frame. A video startup, post-selection process may include one or more of metadata processing, authentication, authorization, dynamic advertisement insertion (DAI) setup, digital rights management (DRM), e.g., license acquisition and key extraction, manifest and media segment download, whether from a local or remote source, media decoding, e.g., including media compression, and rendering. It is worth noting here that although many of the examples disclosed herein refer to video content, the disclosed techniques can be provided more generally and without limitation to other forms of media, such as audio, immersive or 360 video, 3D video, augmented reality, virtual reality, gaming, sensor data from remotely operated vehicles, e.g., drones, and so on. With respect to video, display may occur on any of a variety of display devices, such as televisions, smart televisions, computers, tablet devices, smart phones, video game consoles, augmented and/or virtual reality displays, displays on a home appliance, and the like.

Referring now to FIG. 1, a block diagram is shown illustrating an example, non-limiting embodiment of a communications network 100 in accordance with various aspects described herein. For example, communications network 100 can facilitate in whole or in a warming up of one or more media content items and/or channels or sources for playback, without attaching a video decoder and without actually decoding and/or otherwise rendering any of the warmed up media content, until such time as a user may choose to transition to a one or more of the warmed up media content items. In particular, a communications network 125 is presented for providing broadband access 110 to a plurality of data terminals 114a, 114b, generally 114, via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

According to the illustrative example, one or more of the mobile devices 124a, 124b and/or the vehicle 126 may include a media processing system adapted to warm-up one or more media content items. For example, the media processors include media warm-up functionality 164a, 164b, 164c, generally 164, adapted to perform one or more preparatory steps for presenting the media content, without necessarily decoding and/or otherwise rendering the media content. Various example preparatory steps, such as view setup, authorization, license processing, manifest acquisition and/or preparatory client processing. The media warm-up functionality 164 may be adapted to maintain one or more media content items in a, so called, warmed up state, such that selection of the warmed up media content items for presentation can proceed download, decode and/or otherwise render the media content item for presentation without having to repeat one or more of the already accomplished preparatory steps. Consequently, a delay between selection of a warmed-up media content item and initiation of its playback is substantially reduced, preferably to a virtually imperceptible value, e.g., about 1 second or less.

In accordance with a media warm-up process, the warm-up functionality 164 may facilitate authorization to access the media content item. For example, the warm-up functionality 164 may facilitate authorization via one or more service provider systems 170. Authorization may include provision of user identification including one or more of a device identifier, a user account identifier, e.g., a username and/or password, and/or any other token as may be suitable for authenticating a user and/or user device. Alternatively or in addition, the warm-up functionality 164 may obtain a license and/or establish a digital rights management (DRM) session via one or more DRM servers 174 to access requested media content from one or more media sources, e.g., via one or more content delivery networks 172. Establishment of one or more DRM sessions may include exchange of keys, decryption of media content, and the like. Alternatively or in addition, the warm-up functionality 164 may include acquisition of a manifest files for each of the warmed-up media content items. The manifest files may be processed to identify locations of segments of the requested media content items.

Further according to the illustrative examples, one or more of the data terminals 114a, 114b, generally 114, may include warmup functionality 162a, 162b, generally 162. The media terminal, warm-up functionality 162 may be adapted to implement one or more of the example warm-up steps to facilitate an expedited or otherwise accelerated playback at the data terminal 114a by accomplishing one or more preparatory steps before a particular media content item is selected for presentation. Likewise, the media terminal 142 may include warmup functionality 160 adapted to implement one or more of the example warm-up steps to facilitate an expedited or otherwise accelerated playback via the media terminal 142.

Continuing with a video example, the video startup can be described or otherwise organized according to a workflow adapted to accomplish one or more of the various steps of the aforementioned post-selection, video startup process. On a typical client app that prepares and plays an item in according to a single startup process, may takes anywhere from 2.5 to 5 seconds, or more, for the video to start playing after the user has made a select, e.g., clicked on a video play button. The time taken for the selected video to start can be determined as a sum of the times associated with each of the startup subprocesses to obtain a total time, e.g., summing times associated with each of the metadata processing, authentication, authorization, DAI setup, license acquisition, key extraction, manifest and segment download, decoding and rendering.

Figure 2A:
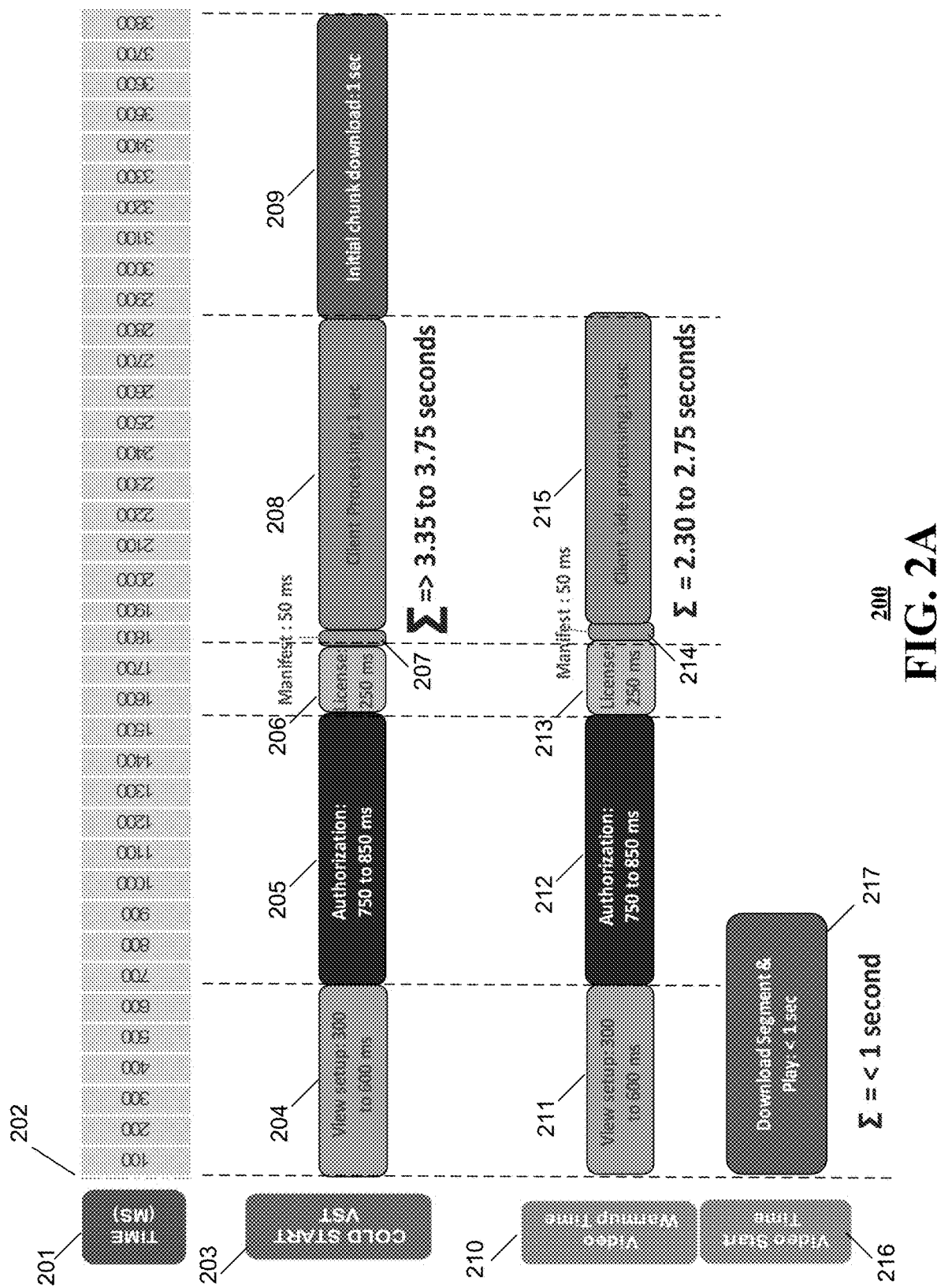
FIG. 2A is a timing diagram illustrating an example accelerated media startup of a non-limiting embodiment of a video player functioning within the communication network of FIG. 1 in accordance with various aspects described herein.

FIG. 2A is a timing diagram 200 illustrating an example accelerated media startup of a non-limiting embodiment of a video player functioning within the communication network of FIG. 1 in accordance with various aspects described herein. Displayed in a horizontal feature along the top of the timing diagram is a time scale 201 measured in milliseconds. The example time scale 201 extends from a reference start time 202, e.g., 0 ms, to about 4 seconds, e.g., about 3800 ms. The reference start time 201 may correspond to an initialization of a media content playback process. The timing diagram 200 illustrates an example of a, so called, cold-start process 203 or workflow in which a target media content item identified for playback has not been warmed up or otherwise prepared for playback. According to the example cold-start process 203, one or more preparatory processes, steps and/or actions are performed or otherwise implemented before the target media content item, in this instance, a target video content item, is decoded and/or otherwise rendered for presentation on a display device.

In a first example, a cold-start process 203, or sequence of events, is initiated at the start time 202, which may coincide with a user selection of a target media content item for playback. The first event includes a view setup procedure 204. The view setup procedure 204 may identify one or more parameters related to a configuration of a playback of video content and one or more surface to rendering the playback video. For example, the view setup may identify a particular area of a display, such as a window, and/or frame, any controls such as play, pause, etc. Consider a windows computer environment in which a user may have one or more windows open on a display device. The size and/or position of each of the windows is configurable, e.g., according to a selection of the user. The view frame size and/or area may be determined according to any suitable criteria, such as pixel coordinates, e.g., width in pixels by height in pixels. Alternatively or in addition, the view frame size and/or area may be determined according to relative screen coordinates, percentages of screen size, and the like.

In at least some embodiments, the view setup may be determined according to a video player theme, or a skin. The theme or skin may identify a display size, and or position in a display field, adjustments to aspect ratios, cropping, resolution, adjustments to one or more of color, intensity, video filtering, e.g., denoising, contrast enhancement, de-flickering, deinterlacing, and the like. In at least some embodiments, the view setup procedure 204 may map a display onto a defined surface, e.g., a billboard in an image scene, a three-dimensional surface that may be presented on the display, and so on. In at least some applications, and without limitation, the view setup procedure 204 may extend between about 300 ms to about 600 ms. It is envisioned that depending upon view complexity, underlying hardware constraints, e.g., processing power and/or speed, the view setup procedure 204 may take less than 300 ms, or more than about 600 ms.

Continuing with the illustrative example, the cold-start process 203 or sequence of events includes an authorization procedure 205. The authorization procedure 205 may facilitate user and/or device access to one or more media content sources and/or particular media content items. The authorization may require an exchange of user credentials, e.g., username and/or password, with one or more of a service provider and/or a media content source. Alternatively or in addition, the authorization procedure 205 may include an exchange of one or more of subscriber authentication information, such as subscriber identification information as may be obtained via a subscriber identity module (SIM) card, and/or device authentication information, such as international mobile equipment identity (IMEI).

Authorization information may be exchanged between a media processor, e.g., a mobile device and a media content provider. Alternatively or in addition, authorization information may be exchanged between a mobile service provider and a media content provider. In at least some embodiments, login credentials may be stored on a device, e.g., as a token, that may be used to facilitate such authorizations. The example authorization procedure 205 may extend between about 750 ms to about 850 ms. It is envisioned that depending upon network conditions, remote authorization system latency, underlying hardware constraints, e.g., processing power and/or speed, the authorization procedure 205 may take less than 750 ms, or more than about 850 ms.

It is understood that in at least some embodiments, access to a media content item may be permitted responsive to successful authorization and otherwise rejected or blocked without proper authorization. Alternatively or in addition, it is understood that at least some media content sources may be open and allow access without necessarily requiring authorization. Accordingly, the authorization procedure 205 may note be required in every instance.

The cold-start sequence of events 203 includes a license coordination procedure 206. It is understood that media content is often protected by one or more access control features, such as one or more access control technologies. Examples include digital rights management (DRM) tools or technological protection measures (TPM). DRM tools can be employed to restrict access to proprietary material and/or copyrighted works, such as software and media content. It is common for DRM techniques to employ restrictive licensing agreements, e.g., restricting media content access to duly authorized consumers. For example, media content may be encrypted and/or otherwise scrambled. Access to the media content may be obtained by application of encrypt keys and/or descrambling keys to decrypt and/or descramble the media content. An exchange of keys may occur according to negotiation of a license to allow a requesting user to decrypt and/or descramble a media content item.

The example license coordination procedure 206 may require about 250 ms. It is envisioned that depending upon network conditions, remote license coordination system latency, underlying hardware constraints, e.g., processing power and/or speed, the license coordination procedure 206 may take less or more than about 250 ms. It is envisioned that in at least some embodiments, the license coordination procedure 206 may depend upon a successful authorization obtained via the authorization procedure 205.

Having accomplished any required authorization and/or license coordination, access to the target media content item is obtained via a corresponding manifest file. The manifest file may be obtained from a media content provider in a manifest acquisition procedure 207. The manifest file may include addresses, locations and/or links to segments of the media content item. The linked segments can be ordered to facilitate acquisition and reconstruction of the media content item by a media player. It is envisioned that the manifest acquisition procedure 207 may take about 50 ms. It is further envisioned that depending upon network conditions, manifest serving system latency, underlying hardware constraints, e.g., processing power and/or speed, the manifest acquisition procedure may take less or more than about 50 ms.

The cold-start sequence of events 203 includes a client processing procedure 208. The client processing procedure includes processing that may be accomplished by a client coordinating a playback of the requested media content item. Client processing may include, but is not limited to, a processing of metadata, e.g., coordination of a media content download service. This may include processing of the manifest in anticipation of downloading of segments of the target media content item. Alternatively or in addition, the client processing procedure may include processing in preparation for decrypting and/or decoding the media content item, e.g., according to the DRM. Still further processing of the client processing procedure 208 may performed be in support of preparation for display the media content item according to parameters obtained via the view setup procedure 204. In at least some embodiments, client processing procedure 208 includes preparation for downloading of the media content, and/or preparation for decoding the media content. It is envisioned that the client processing procedure 208 may take about 1 second. It is further envisioned that depending upon network conditions, manifest serving system latency, underlying hardware constraints, e.g., processing power and/or speed, the client processing procedure 208 may take less or more than about 1 second.

According to the illustrative embodiment, the view setup procedure 204, the authorization procedure 205, the license coordination procedure 206, the manifest acquisition procedure 207 and the client processing procedure 208 can be considered as embodying a preliminary phase that may occur before the media content item is downloaded and subsequently decoded and rendered for display. The example preliminary phase is accomplished in about 280 ms. A segment download procedure 209 to obtain at least an initial media content segment or chunk follows during which an initial segment of the media content item as identified in the manifest file is obtained from a remote media source. The initial segment download may take about 1 second, such that the example delay from the reference start time 201 to a conclusion of the initial segment download is about 3.75 seconds, sometimes referred to as a video start time—a time between a user selection of a media content item and initialization of a display of the selected item.

It is understood that such a substantial delay may be cumbersome to a user who is surveying multiple media content items in an attempt to identify a preferred media content item. Such content items surveys may be accomplished via an electronic programming guide and/or a video content listing, lineup and/or catalog. It is understood further that a reduction in playback responsiveness to about 1 second or less provides a user with a preferred experience when surveying multiple media content items.

The example cold-start process 203 is representative of a typical scenario in which most of the startup activities occur in a sequential manner, with output from one activity becoming input of another. If any activity in the workflow fails and initiates retry, it can take longer than 5 seconds for the video to start. It is recognized herein that video start time can be reduced by having some of the activities in the playback workflow execute in parallel. For example, one or more of the view setup procedure 204, the authorization procedure 205, the license coordination procedure 206, the manifest acquisition procedure 207, and the client processing procedure 208, e.g., processing metadata, and, may be performed in a parallel manner, e.g., concurrently and/or contemporaneously responsive to a user selection of a media content item for playback. It has been observed, however, that such a parallel approach may not reduce the video start time in a significant manner. When video takes longer to start, there are surveys that show 80% of users tend to abandon watching it. Further, when each item takes greater than a second to load, browsing through channel lineup with scores or even hundreds of channels, is a painfully slow process.

According to the techniques disclosed herein, one or more of the view setup procedure 204, authorization procedure 205, the license coordination procedure 206, the manifest acquisition procedure 207, and the client processing procedure 208, and, may be performed in advance of a user selection of the media content item for playback. For example, a video warm-up procedure 210 or workflow may include one or more of a preparation of a playback view 211, a coordination of authorization 212, a coordination of a license to the media content item 213, a manifest file access procedure 214 to obtain a copy of a corresponding manifest file, and a client side processing 215, e.g., a processing of metadata. Although the example warm-up procedure is illustrated as starting at the reference start time, it is understood that the process would be initiated in advance of any selection for presentation. Namely, the video warm-up procedure 210 would preferably be concluded in advance of any later selection of the media content item for playback. In some embodiments, the video warm-up procedure 210 is concluded just prior to a selection of the media content item for playback. Alternatively or in addition, the video warm-up procedure 210 is completed seconds, minutes, hours or more in advance.

The warmed-up media content items can be maintained in a warmed-up state, such that the actions accomplished by implementation of the video warm-up procedure 210 do not have to be repeated responsive to a later selection of the warmed-up media content item for display. According to the illustrative example, a user selection of a warmed-up media content item is made at the stat time 201. Having previously accomplished the preparation of a playback view 211, the coordination of authorization 212, the coordination of license procedure 213, the accessing of the manifest file 214, and the client side processing 215, an accelerated video playback procedure 216 or workflow includes decoding and/or rendering a downloaded segment of the selected media content item and initiation of playback, e.g., providing a decoding and/or rendering of the segment at 217 for display at a client device. In at least some embodiments, the video playback procedure 216 may include downloading of one or more segments according to the video manifest. According to the illustrative example, the video playback procedure 216 may take about 1 second or less between a user selection and initiation of a display of the selected media content item.

At least one benefit of the techniques disclosed herein is a reduction of the video start time to less than 1 second. The reduced video start time not only give user an impression of instant video start but also allows surfing through the channel lineup quickly. The solution thus provides a significantly improved user experience in video start and channel browsing on over the top (OTT) platform, similar to that on traditional broadcast TV. It is understood that in at least some applications, the accelerated video startup techniques disclosed herein may further reduce video start failure by facilitating a resolution of errors during a warmup phase.

Figure 2B:
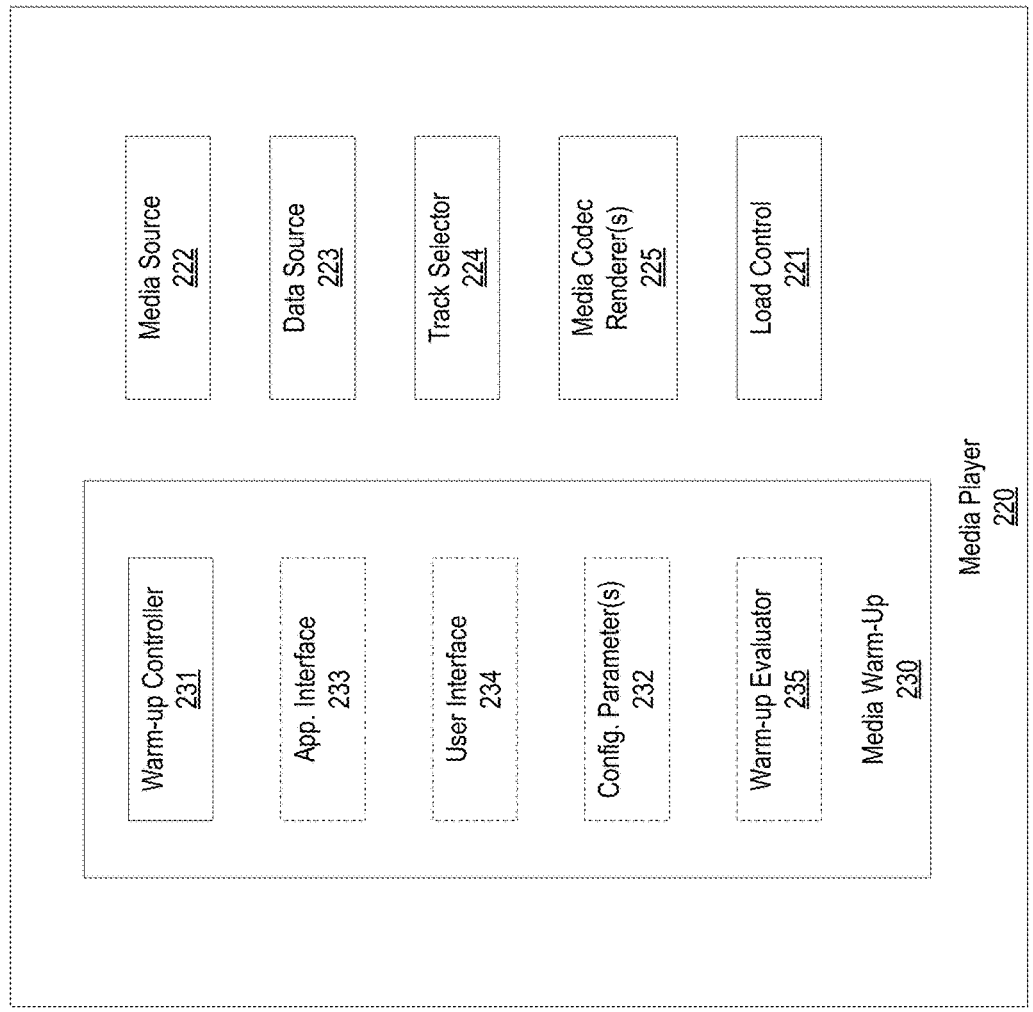
FIG. 2B is a block diagram illustrating an example, non-limiting embodiment of a media player in accordance with various aspects described herein.

FIG. 2B is a block diagram illustrating an example, non-limiting embodiment of a media player 220 in accordance with various aspects described herein. The media player 220 includes a load controller 221, a media source processing module 222, a data source processing module 223, a track selector 224 and one or more media codec renderers 225. The load controller 221 can be adapted to facilitate a loading of a selected media content item to the media codec renderer 225. Depending upon a user selection, the load controller 221 may load a media content item that has not yet been warmed up. In such instances, the cold-start process 203 (FIG. 2A) would apply, such that a relatively substantial delay, e.g., greater than about 1 second, would be expected. Once again, depending upon the user selection, the load controller 221 may load a media content item that has already been warmed up. In such instances, the video playback procedure 216 (FIG. 2A) of a warmed-up content item would apply, such that a relatively short delay, e.g., about 1 second or less, would be expected. Responsive to selection of a warmed-up media content item, one or more of the media source processing module 222, the data source module 223 and the track selector 224 may leverage results of the warm-up procedure 210 (FIG. 2A).

It is envisioned that in at least some embodiments, the media player 220 includes a media warm-up processing module 230. The warm-up processing module 230 may include a warm-up controller 231. Alternatively or in addition, the warm-up processing module may include one or more of an app interface 233, a user interface 234, a configuration processing module 232, and a warm-up evaluator 235. The warm-up controller 231 may be adapted to determine a capacity or limit to a number of media content items that may be warmed-up. It is understood that such limitations may depend upon one or more of device capabilities, e.g., processing capacity, memory capacity, video encoding processor capacity. Alternatively or in addition, such limitations may depend upon one or more of available network bandwidth, current network conditions, current and/or anticipated power consumption, power reserves, user preferences, content availability, and so on. It is also understood that in at least some embodiments, the warm-up controller 231 may manage warmed-up media content items, by adding to a collection of warmed-up media content items, removing from the collection of warmed-up media content items and/or exchanging previously warmed-up media content items with newly warmed-up media content items. Without limitation, such management of warmed-up content may be responsive to one or more events, such as past user selections, current content display, frequency of past display, content source, time of day, user identity, day of week, user profile, user preferences, advertising, and the like.

The app interface 233 may facilitate interaction of the media player 220 with an app through which the media content is selected and presented for display. It is envisioned that the media player 220 may be a stand-alone device. Alternatively or in addition, the media player 220 may be integrated and/or otherwise provided within an app.

The user interface 234 may include any available user interface suitable for accepting input from a user. Examples include, without limitation, a touchscreen, a keyboard, a pointing device, such as a mouse, a microphone, a speech-to-text processor, a camera, e.g., to capture photos as might be used to facilitate authorization, a video capture system, e.g., to obtain gesture-based inputs from a movement of a user's body, and the like. User input may be used to obtain a user selection of a media content item or items, e.g., from a presentation of a video catalog and/or program guide, and/or channel lineup and so on. User input may be used in association with an authentication procedure, e.g., to accept validating input from a user, such as a username, a password, a voice signature, face recognition, a fingerprint, and the like.

In at least some embodiments, user input may be used provide feedback on performance of a media content warm-up system. Such feedback might include a ranking of past and/or current performance, e.g., good, fair, poor. Alternatively or in addition, the user input may be used to establish and/or modify a user profile that may be used in association with a media content warm-up workflow. A user profile may include a user's preferences for one or more of a particular channel or channels, a particular program or programs, a particular series, genres, e.g., comedy, drama, documentary, news, content types, e.g., movies, TV series, periods, e.g., current, oldies, particular actors, and/or directors and/or producers, and/or studios. Alternatively or in addition the user profile may identify technical features of the content, such as a screen size and/or a resolution, e.g., certain content preferred on small screen display devices, whereas, the same or different content may be preferred on a large screen display devices. It is understood that user preferences may be dependent upon one or more of a viewing audience, e.g., age appropriate content when children are likely to be present, a viewing time, a viewing location, a day of the week, and so on.

The configuration processing module 232 may be adapted to implement and/or support a video player view setup, such as the view setup procedure 204 (FIG. 2A). The configuration processing module 232 may identify one or more parameters related to a configuration of a playback of video content. This may include identification of a type of display device, a screen size, a frame size, which may be the entire screen or something less, a video player skin and/or theme, and so on. Configuration parameters may be relative to one or more of a pixel location, a pixel range or ranges, according to a viewport as may be established relative to one or more of a pixel location, a pixel range or ranges, and the like.

The warm-up evaluator 235 may be adapted to calculate, and/or otherwise determine one or more parameters related to operation of the media warm-up processing module 230. For example, the warm-up evaluator 235 may track one or more of a total count, e.g., a number of overall viewer media content selections, a success or "hit" count or number of those media content selections that were served by warmed-up content and/or a failure or "miss" count or number of those media content selections that could not be served by warmed-up content, e.g., resulting in a cold-start process 203 (FIG. 2A). One or more metrics can be determined based one or more of the counts, such as success or hit rates, failure or miss rates, rations of hits to total, hits to misses, misses to total, misses to hits, and so on.

In at least some embodiments, the warm-up evaluator 235 may apply machine learning, e.g., adjusting future selections of media content for warm-up based on past performance. It is understood that machine learning techniques may be applied to improve performance over time based on one or more of a training of the media warm-up processing module 230, an improved understanding of user habits, and the like. In at least some embodiments, the warm-up evaluator 235 may include and/or otherwise cooperate with artificial intelligence (AI). The AI may be adapted to improve performance over time based on one or more of adjusting predictive performance of the media warm-up processing module 230 based on one or more inputs, such as viewer selections, hit and/or miss performance, behavior modeling, media content type, advertising associated with one or more of the media content items, and so on.

It is understood that one or more of the modules of the warm-up processing module 230, such as the warm-up controller 231, the app interface 233, the user interface 234, the configuration processing module 232, and/or the warm-up evaluator 235, may communication with one or more other modules of the media warm-up processing module 230 and/or one or more other modules of the media player 220, such as the a load controller 221, the media source processing module 222, the data source processing module 223, the track selector 224 and one or more of the media codec renderers 225.

Figure 2C:
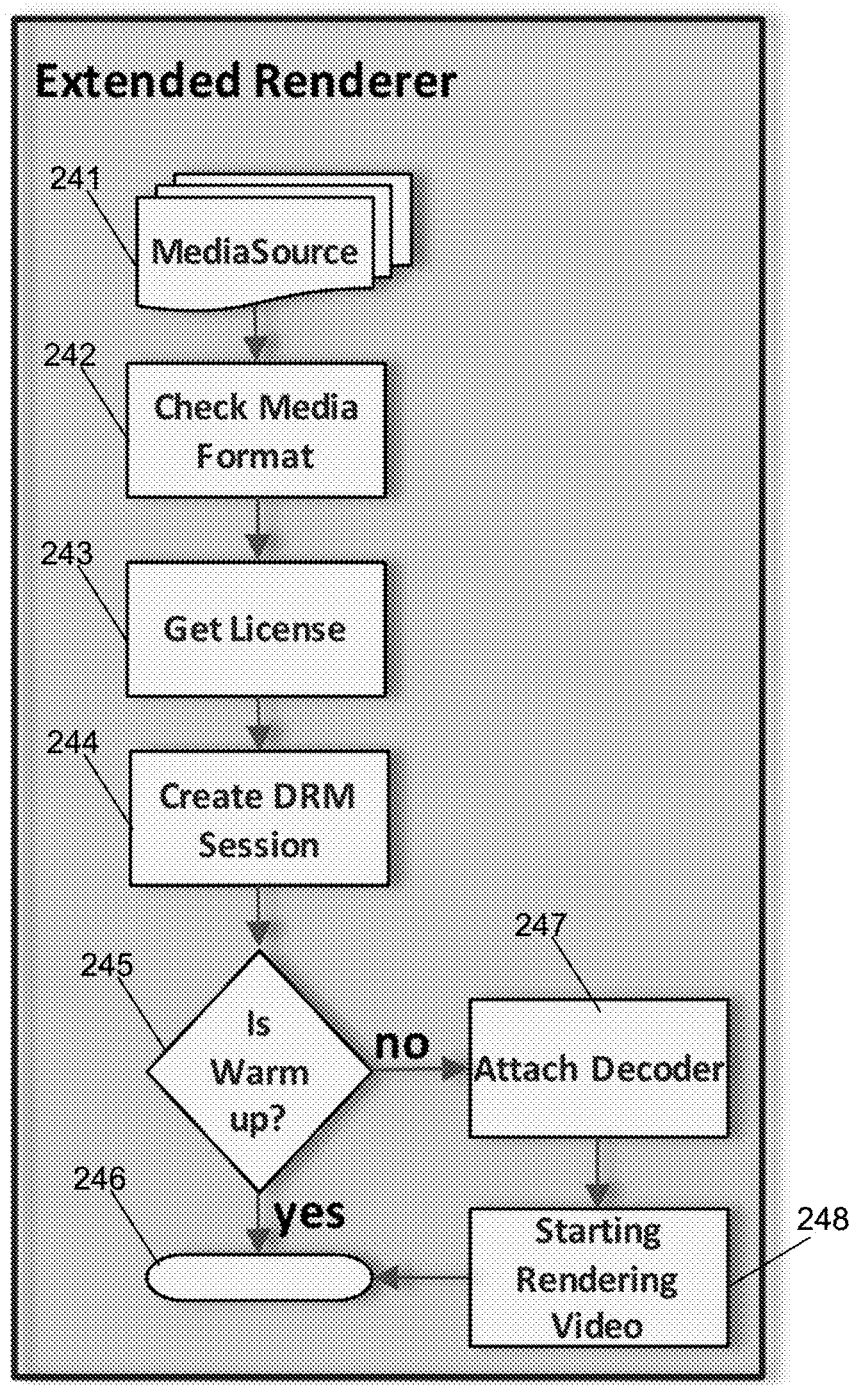
FIG. 2C depicts an illustrative embodiment of a process in accordance with various aspects described herein.

FIG. 2C depicts an illustrative embodiment of a video player process 240 in accordance with various aspects described herein. According to the video player process 240, one or more media content items are identified at 241. The media content items may include multiple media content items from a single media content source and/or one or more media content items from each of multiple media content sources. Identification of the media content items may include obtaining user selections of preferred media content items and/or media content item sources, e.g., channels of a service provider's channel lineup, channels of an electronic programming guide, particular programs, e.g., a series, a movie, and the like. A user may make menu selections via a user interface. The selections may include one or more than one media content items and/or sources that may or may not be associated with one or more of time(s), location (s), viewing audiences, etc.

It is envisioned that one or more rules may be established to determine and/or otherwise select a particular media content item or source from a group of media content items or sources, to obtain a subset of selected media content items or sources. A size of the number of selected media content items and/or sources and/or a size of the subset of the same may depend upon a user device warm-up capacity. Consider an example in which a user may select a total number, e.g., 5, 10, 25, or more, media content items, and/or sources. The user device, at any given time may support a particular warm-up capacity, say 4 media content items and/or sources. According to the illustrative example, a subset of 4 media content items and/or sources may be selected from the total number of selected media content items and/or sources. Such a subset selection may be made according to any of the various selection criteria disclosed herein, e.g., according to a user profile, a user model, past performance of the warm-up processor, predictions, and so on. In at least some embodiments, the user and/or a media content selection process that may operate with or without user intervention, may categorize the selected media content items and/or sources. Categories may include one or more of most likely to be selected, moderately likely to be selected, and/or least likely to be selected. In at least some embodiments, the media content items and/or sources are rank ordered to obtain a rank-ordered list. Such rank-ordered listings may be determined according to a likelihood that a user will select a particular media content item and/or source at a future time.

In at least some embodiments, an evaluation of the media format is performed at 242. A determination of the format may be relevant based on one or more of a user subscription level, a viewing device, a user preference, and the like. Alternatively or in addition, a determination of the media format may be relevant to facilitate later processing, such as view setup, and/or decoding, and/or rendering.

To the extent that access to the identified media content item or source requires a license, such a license is obtained and/or otherwise coordinated at 243. In at least some instances the media content and/or source may incorporate protection, e.g., according to DRM techniques. Having obtained a license at 243, an exchange of access parameter, e.g., according to cryptographic material, such as a key or keys, may be performed. The access parameter or key may be used to decrypt and/or otherwise descramble the protected media content item and/or source. In at least some embodiments, a DRM session is created at 244. The DRM session, once created ensures that a user and/or user device having established any necessary licenses at 243, has any information as may be required, such as encryption key or keys to access to the media content item or source in a manner to allow for subsequent decoding and/or rendering for display at the user device.

A determination is made at 245 as to whether one or more of the preceding acts of identifying media source(s) at 241, the checking of media format at 242, coordination of any license at 243 and creation of DRM session at 244 were accomplished according to a warm-up process. To the extent it is determined at 245 that the preceding acts were not associated with a warm-up, but rather with a user selection for immediate playback, the process 240 continues by attaching a decoder at 247 and/or initiating a decoding and/or rendering of the media content item at 248. By way of example, a cold-start process would perform the selection of the media content at 241, e.g., according to a user selection for immediate playback. Subsequent to the user selection, the media format may be checked at 242, any licenses obtained at 243, any required DRM sessions established at 244, decoder attached at 247 and an initiation of the decoding and/or rendering of the media content at 248. As discussed previously, such a cold start process may take several seconds or more.

To the contrary, a warm-up process suggests that the identification of the media content and/or source at 241 was not responsive to a user selection for immediate playback, but rather resulted from a prediction of a media content item and/or source that a user may likely request at a future time, e.g., within a prediction window, such as the next 10 seconds, the next 30 seconds, the next minute, the next several minutes, the next half hour, the next hour, the next programing time period, and the like. Accordingly, to the extent it is determined at 245 that the preceding acts are associated with a warm-up, the process continues to 246 without attaching a decoder at 247 and/or initiating a decoding and/or rendering of the media content item at 248. From 246, the process 240 may repeat from 241 one or more times, e.g., to warm up multiple media content items and/or sources.

In at least some embodiments, a video start workflow can be divided into two phases, referred to herein as a warmup phase and a presentation or play phase. A warmup phase involves preparing a video content item for playback without actually playing it. In at least some embodiments, the item warmup phase includes virtually everything required for playback, stopping short of attaching the video content to a decoder and/or rendering the video. In some embodiments, the warmup phase includes downloading at least a portion of video segments, while in other embodiments, the warmup phase stops short of downloading any of the video segments. A video content item having been processed according to the warmup phase can be referred to as a warmed-up video content item. During any given time period, more than one video content item can be prepared in such a manner. An exact number of content items processed in this manner may vary, e.g., depending on a device's processing power and/or available memory.

An item play phase involves playing a warmed-up video content item by downloading video segments, attaching a decoder to one of the warmed-up video content items selected for playback, and instantly start playback. In at least some embodiments the play phase includes detaching the decoder from a previously playing video content item. With the above approach of warming up video content items before playback, video start time can dramatically reduced, e.g., in at least some applications to approximately 1 second or less for each item. By reducing a delay between video content item selection and playback, a user is given an impression of instant video start. The accelerated video startup process can also promote fast surfing through a channel lineup. The approach may reduce video start failure by presenting better opportunities to resolve a majority of errors during the warmup phase.

In at least some embodiments, at least some of the functionality of the multi-phase video playback approach can be implemented in a video player. For example, functionality adding a warmup phase can be added to existing video players, e.g., including open source video players. The simplicity of the implementation of the solution by minimally extending existing video player components, makes it easy to adopt in an existing streaming app.

Instant video start techniques, such as the example accelerated startup techniques disclosed herein, adopts a multi-step, e.g., a two-step, approach to video start. A first step, referred to as a warm-up step, can be adapted to handle one or more time-consuming activities involved in starting the video playback. In some embodiments, a majority of such time-consuming preliminary steps are performed during the warm-up step. Examples of such non-play startup activities include, without limitation, metadata processing, authentication, authorization, DAI setup, license acquisition, key extraction, manifest download, and the like. This step may not decode and/or render video for display, and in at least some instances, this step may not include downloading and/or caching the video content. The warm-up step may take about 2 to 3 seconds or more and is executed prior to user selecting an item to play, in anticipation of the item being played.

A second step, referred to generally as a playback step, picks up an item that has been prepared in the first step, starts downloading video segments, decodes and renders the video. With fewer steps, e.g., just three activities, involved in this step, selected video may start to play in less than a second after being selected. Most present video player devices have limited number of decoders, whether implemented in hardware, software or a combination of hardware and software.

The techniques disclosed herein can be adapted to ensure that a decoder is available when an item is selected for playback. For example, when no decoders are available, a decoder can be detached from a previously played item and attached to the one selected to play. The solution can be implemented through simple extension to the existing video players, to concurrently execute multiple playback workflows. It is believed that no currently available solutions are able to carry out majority of activities involved in video start, prior to an item being selected for playback. The disclosed techniques can be distinguished from merely caching authorization, prefetching manifest, and even pausing an item to keep it warm for future playback, by enabling a consistent reduction of video start to less than 1 second. For the solution to be very effective, it is important to warm items that are most like to be played. These items could be previously played item, items on the favorite list, most frequently played items, etc. Selecting these items using intelligent algorithms can significate enhance the user experience.

Switching from Live streaming (from content delivery network (CDN)) to time-shifted streaming (e.g., from a live event recording service) for pause-live requires handling two manifest. Switching using traditional playback flow cause longer interruption in the playback. The techniques disclosed herein for keeping multiple channels warm for quicker video start can be extendable to keep content of a single channel from multiple sources warm. For example, upon seeking to a position before the live point or returning to the live point, playback can start instantly when the content from corresponding source is kept warm.

Figure 2D:
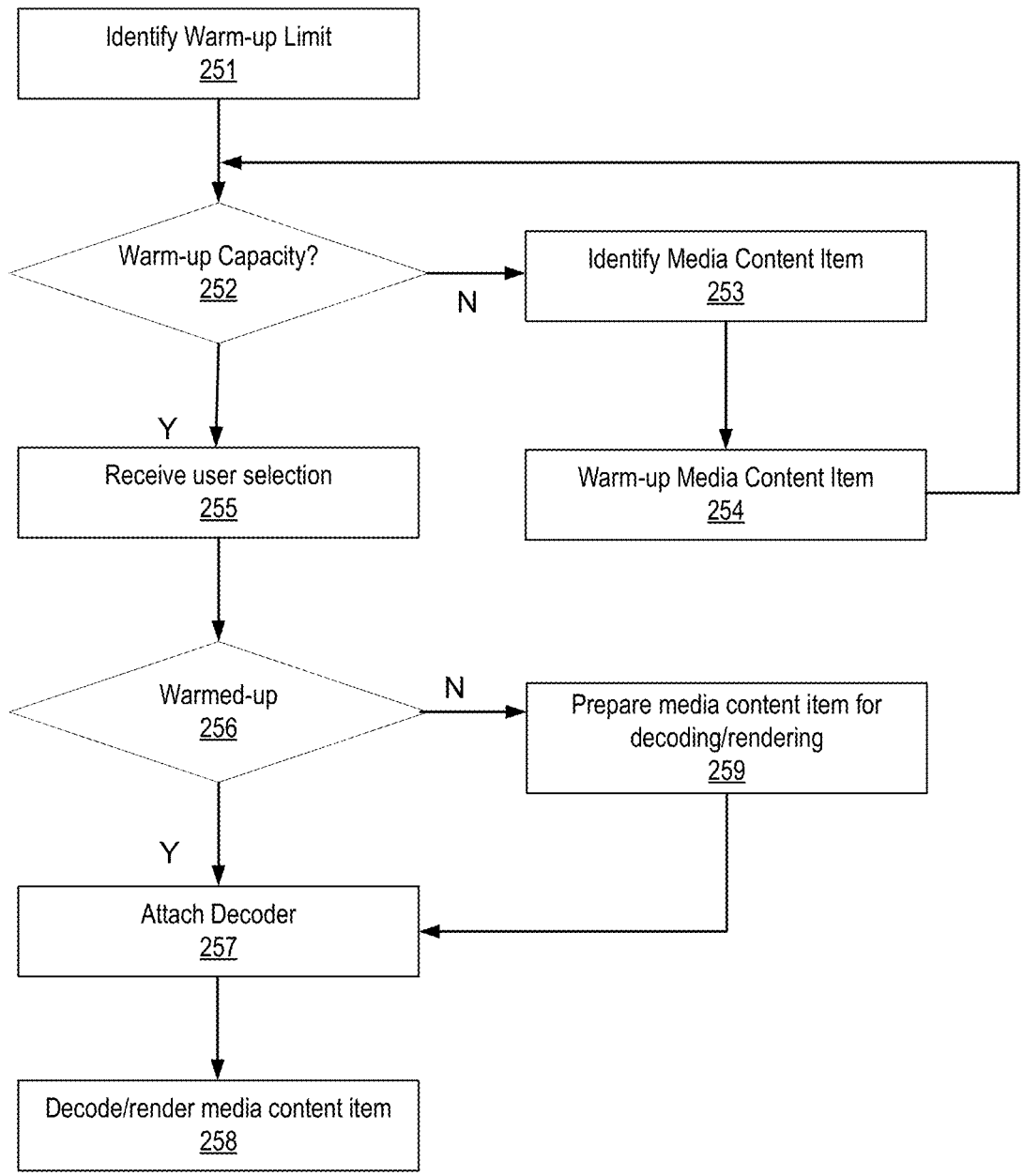
FIG. 2D depicts another illustrative embodiment of a process in accordance with various aspects described herein.

FIG. 2D depicts an illustrative embodiment of another process 250 in accordance with various aspects described herein. A warm-up limit is determined at 251. A warm-up limit refers to a number of media content items and/or sources, e.g., streaming media sources, that may be warmed up at the same time. The warm-up limit may depend upon a device processing capacity, e.g., as it may relate to a number of simultaneous DRM sessions that may be supported. Alternatively or in addition, the limit may depend upon one or more of a device storage capacity, e.g., and available memory and/or available cache size, a level of subscription, e.g., warmup-up may be offered as a service add on, which may impose one or more limits, e.g., with higher levels of subscription offering greater warm-up limit. In some embodiments, a warm-up limit can be determined according to a look-up table, e.g., according to a device type and/or subscription level. Alternatively or in addition, the warm-up limit may depend upon one or more of a processing load due to other processes, which may include other warmed up media content items and/or sources, network conditions, bandwidth, power consumption, power capacity, time of day, day of week, location, and the like.

A determination can be made at 252 as to whether warm-up capacity has been reached. For example, a number of media content items and/or sources already warmed up may be determined, e.g., as reported by a warm-up controller 231 (FIG. 2B). The number of warmed up media content items and/or sources may then be compared to the warm-up limit obtained at 251. To the extent that the number of warmed-up media content items and/or sources is below the warm-up limit, a determination can be reached at 252 that warm-up capacity has not been reached. Accordingly, the process may continue by identifying another media content item and/or source at 253. For example, another media content item and/or source may be obtained from a predetermined list of media content items and/or sources, e.g., a rank ordered listing, in which instance, the next highest ranking media content item and/or source may be identified at 253. Alternatively or in addition, a next media content item may be identified according to an algorithm and/or predetermined rules. The algorithm may be based on one or more of a user profile, user selections, a user behavioral model, a time of day, day of week, current media content selection, past media content selections, currently warmed-up media content items and/or sources, and so on.

The process 250 continues by warming-up at 254, the media content item and/or source identified at 253. The warming-up may include one or more of the various warm-up procedures disclosed herein or otherwise generally known as prerequisite procedures to be accomplished before decoding and/or rending is possible. By way of example, the warm-up media content item at 254 may include the acts of checking media format 242, the coordinating of a license at 243, the creation of a DRM session at 244 (FIG. 2C). The process 250 may return to identification of a warm-up limit at 251, for situations in which the limit may be subject to change, e.g., changing processor loading, power capacity, available memory, and the like. Alternatively or in addition, the process 250 may continue to determine whether process capacity has been reached at 252.

To the extent it is determined at 252 that the warm-up capacity has been reached, the process 250 may monitor for an event, such as receipt of a user selection. To the extent that a user selection is received at 255, a determination may be made at 256 as to whether the selected media content item and/or sources is currently in a warmed-up state. To the extent it is determined at 256 that the selected media content item and/or sources is in a warmed-up state, a decoder may be attached at 257. Having attached a decoder, the selected media content item and/or source may be decoded and/or otherwise rendered for display at 258, without having to repeat one or more of the procedures accomplished during a warm-up phase. Consequently, a time delay between receipt of the user selection and decoding and/or rending of the media content item can be shortened, e.g., under 2 seconds, preferably under 1.5 seconds and more preferably at our about 1 second or less.

However, to the extent it is determined at 256 that the selected media content item and/or sources is not a warmed-up state, the selected media content item and/or source may be prepared for subsequent decoding and/or rendering at 259. Such preparatory procedures may include one or more of the procedures implemented at the warm-up media content item at 254 for other warmed-up content and/or sources. For example, preparation of the media content item and/or source at 259 may include the acts of checking media format 242, the coordinating of a license at 243, the creation of a DRM session at 244 (FIG. 2C). After having been suitably prepared for decoding/rendering at 259, a decoder may be attached at 257, and the selected media content item and/or source may be decoded and/or otherwise rendered for display. Without a benefit of a warm-up phase, it is expected that a time delay between receipt of the user selection and decoding and/or rending of the media content item will be greater, and possibly substantially greater than the aforementioned limits of under 2 seconds, preferably under 1.5 seconds and more preferably at our about 1 second or less available to warmed-up media content items and/or channels.

While for purposes of simplicity of explanation, the respective processes are shown and described as a series of blocks in FIGS. 2C-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
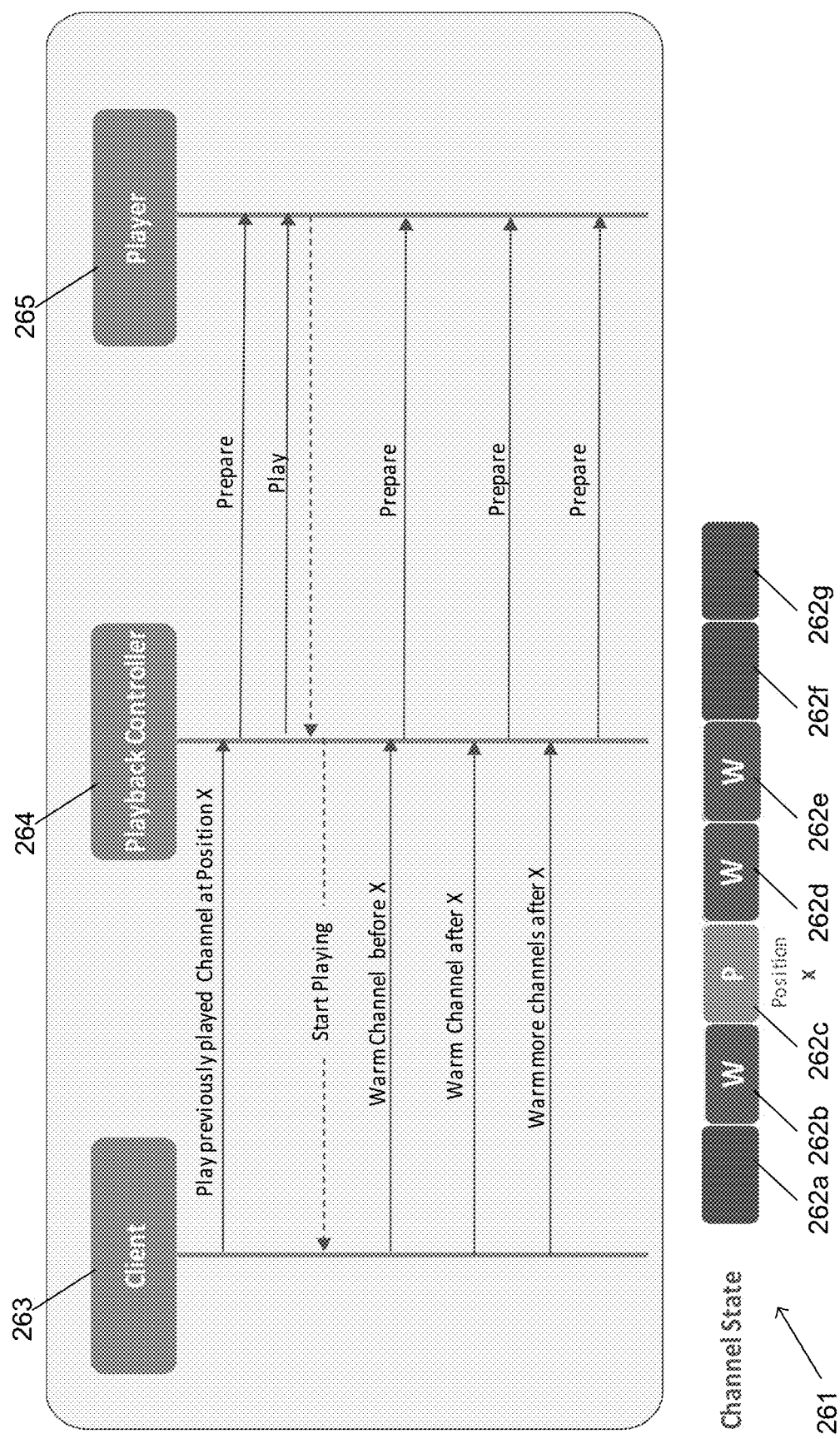
FIG. 2E is a block diagram illustrating an example, non-limiting embodiment of a media content item warm-up process.

FIG. 2E is a block diagram illustrating an example, non-limiting embodiment of a media content item warm-up process 260. According to the first example process 260, media content items are warmed-up according to a media content play selection. An example media processing application may include a client 263, a playback controller 264 and a video player 265. Without limitation the client application may include an electronic programming guide application, a video service provider application, a custom media processing application. The video player may include a custom video player, adapted to include one or more of the various techniques disclosed herein, including warm-up techniques, and content selection and/or processing when warm-up techniques are available. According to the illustrative example, the video playback controller 264 may be disposed between the client 263 and the player 265.

In operation, the client 263 may generate a request to play a previously played channel, e.g., a channel at position x, within an ordering of channels. For example, the channels may be channels of an electronic programming guide, and/or media content items of a presented listing of media content items of a media content provider. In at least some embodiments, the ordered channels are determined according to a predictive algorithm adapted to identify a group of channels and/or content items most likely to be selected next, given a currently and/or previously selected channel and/or content item. The predicted group of channels and/or content items 261 may include channels/content items 262a, 262b, 262c, 262d, 262e, 262f, 262g, generally 262. According to the illustrative example, channel/content item 262c corresponds to position x within the channel grouping 261. Several adjacent channels/content items of the channel grouping 261 have been warmed up and are identified in a warmed up, i.e., "W", state. These channels/content items include channel/content items 262b, 262d, 262e. One of the channels at position x, i.e., channel/content item 262c is identified as a currently playing channel.

According to the illustrative example, the playback controller 264, responsive to receiving the request to play the previously played channel at position x, submits a request to the video player 265 to prepare for playing the selected channel. The playback controller 264 follows by submitting a subsequent request to the video player 265 to proceed to play the selected channel. Playing of the channel includes assignment of the channel to a video player and/or video decoder, and subsequent decoding and/or rending of the selected channel for display at the user device. The player 265 starts playing the selected channel 262c and may provide in indication to that effect to the playback controller 264, which may, in turn, provide an indication to the same effect to the client device 263, which may present the decoded and/or rendered content for display.

Having established selection and/or playback of the selected channel 262c at position x, without regard to any other channels that may or may not be warmed up, one or more channels adjacent to position x may be identified as candidates for warm-up. According to the illustrative example, this may include one preceding channel, e.g., channel 262b, and one or more subsequent channels, e.g., channels 262d, and 262e. Reference preceding and subsequent suggests a direction of user surfing through a lineup. In at least some embodiments, a direction may be determined by a comparison of a current position to an immediately previous channel position. This may allow for the direction to change as a user may decide to scan a channel lineup to the right or to the left, or to the top and to the bottom, as the case may be. Having determined a direction of surfing, candidate channels for warm-up may be biased to warm-up more channels in a forward direction, anticipating subsequent surfing to occur according to the predetermined direction. In at least some embodiments, as in hedging a bet, at least one channel may be warmed up adjacent to the selected channel, but in an opposite direction, to anticipate a possible change of surf/channel search direction.

The client 263 submits a request to the playback controller 264 to warm up one channel before position x and requests to warm up one channel after position x. In at least some embodiments, the client 263 submits a request to the playback controller 264 to warm up additional next channels after those already warmed up. Such additional channels may be initiated according to either side of position x, and in at least some instances, a greater number of warmed-up channels being established according to a surf/search direction. The playback controller 264, in turn submits a request to the video player to prepare the identified channels according to a warm-up phase, without necessarily attaching any of the warm-up channels to a video decoder and/or renderer.

Figure 2F:
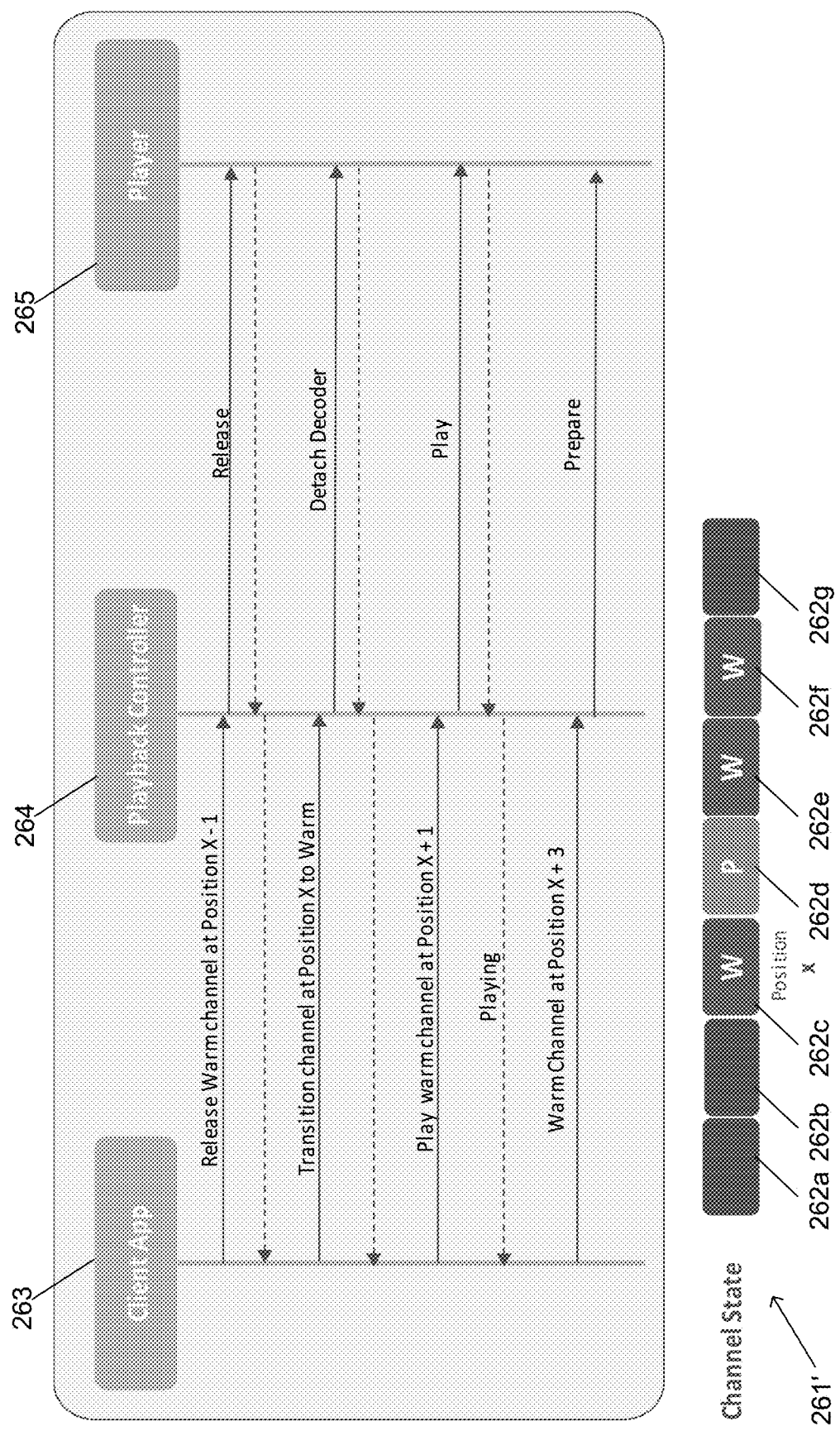
FIG. 2F is a block diagram illustrating an example, non-limiting embodiment of a media content item warm-up transition process.

FIG. 2F is a block diagram illustrating an example, non-limiting embodiment of a media content item warm-up transition process 260'. According to the example warm-up transition process 260', a previously selected media content item is released according to a subsequent media content play selection. The warm-up states of one or more other channels may be updated or otherwise modified according to the subsequent media content play selection. According to the illustrative example, a user has selected a new channel for playback. The new channel is channel 262d, the channel to the immediate right of previously played channel 262c at position x. In order to maintain a warm-up strategy of one channel to the left and two to the right, certain actions are undertaken to warm up one or more new channels and in at least some instances, to release one or more previously warmed up channels, e.g., to ensure capacity for newly warmed up channels.

According to the illustrative example, channel 262c at position x, transitions from a previously playing channel to a warmed-up channel. Likewise, previously warmed up channel 262d transitions to a currently playing channel. Previously warmed up channel 262e remains warmed up, and channel 262f, go the immediate right of channel 262e is warmed up to re-establish the warm-up strategy of one channel to the left and two to the right of the currently playing channel 262d.

In more detail, responsive to a user selection, the client device or app 263 instructs the playback controller 264 to release warmed up channel at position x−1. The playback controller 264, in turn, provides an instruction to the video player 265 to release the channel at position x−1. Release of a channel may terminate any associated DRM session and perhaps release any cached values. The client app 263 may instruct the playback controller 264 to transition previously playing channel at position x to a warmed-up state. The playback controller 264, in turn, may instruct the video player 265 to release or otherwise detach any decoders associated with the previously played channel.

The client app 263 may next instruct the playback controller to play the channel at position x+1. The playback controller 264 may, in turn, determine whether the channel at position x+1 is in a warmed-up state. To the extent it is in a warmed up state, the playback controller 264 may instruct the video player 265 to attach a decoder, and proceed to decode and/or render the channel at position x+1, thereby establishing that channel as a currently playing channel. Having freed capacity by releasing warmed up channel at position x−1, the client app 263 may instruct the playback controller to warm up a new channel at position x+3. The playback controller 264 provides the video player 265 with instructions to prepare channel 262f at position x+3 as a warmed-up channel.

Figure 2G:
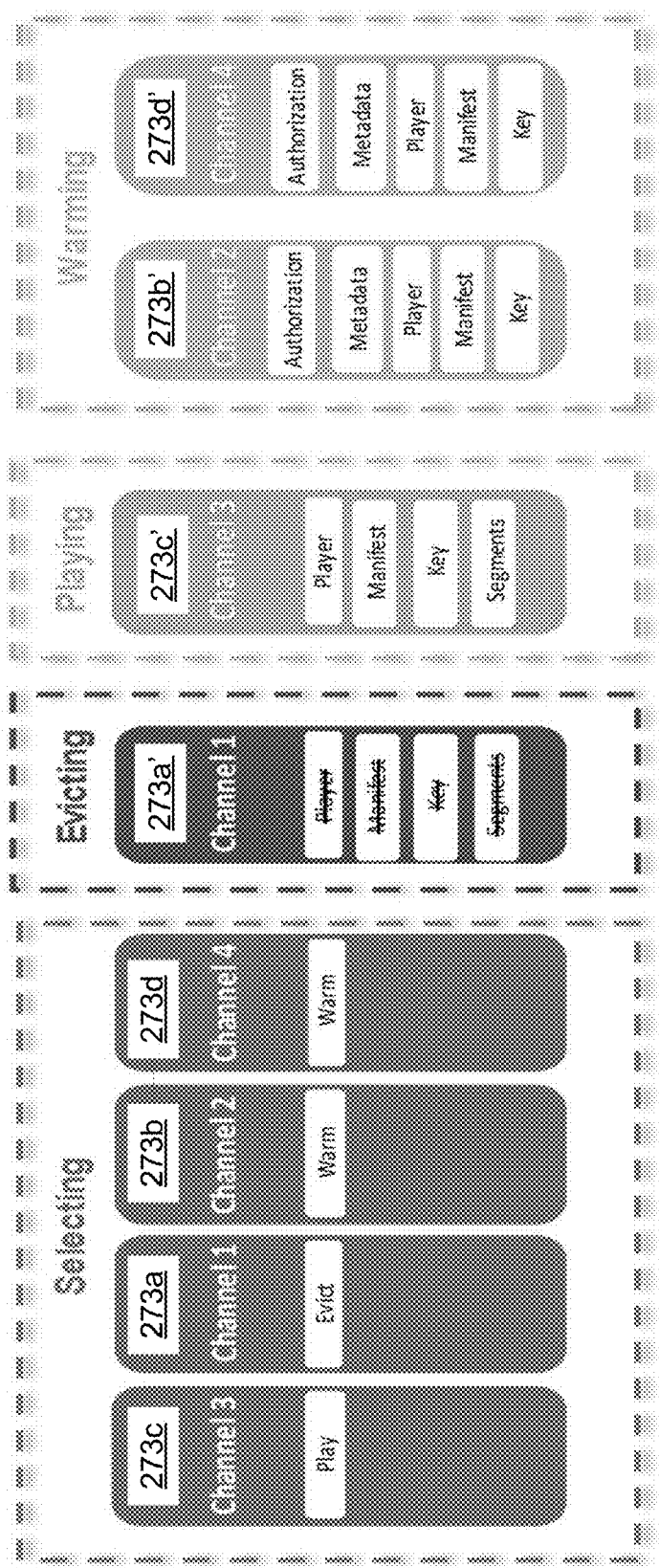
FIG. 2G is a schematic diagram illustrating an example, non-limiting embodiment of channel states of a group of channels being processed by the media processing system of FIG. 1 and FIG. 2B in accordance with various aspects described herein.

FIG. 2G is a schematic diagram illustrating an example, non-limiting embodiment of channel states 270 of a group of channels being processed by the media processing system 100 of FIG. 1 and 220 of FIG. 2B in accordance with various aspects described herein. A first group of selected channels includes a first channel 273a, a second channel 273b, a third channel 273c, and a fourth channel 273d. The first, second and fourth channels 273a, 273b, 273d were selected according to a warm-up process in which the subset of channels have been configured in a warmed-up state. The third channel 273c is identified as a channel selected by a user for playback at a user display device, e.g., via an app resident on the user device. In at least some embodiments, there exists a limited number of channels that may be warmed up at the same time. Consider that an example video player has been modified to separately warm up one or more channels without attaching them to one or more video decoders, thereby maintaining the warmed-up channels in a ready state having established one or more preparatory acts required for playback.

According to the illustrative example, a warmed-up channel limit is two. The video player was previously playing back the first channel 273a when a user selected the third channel 273c for playback. In some embodiments, only one channel may be played back at a time. According, the user's selection of the third channel 273c initiates an eviction of the first channel 273a from the player. The second and fourth channels 273b, 273d, having been warmed up and being below a maximum limit of warmed up channels, remain in a warmed-up state.

In more detail the first channel, when previously playing was associated with and/or otherwise attached to video player. A manifest associated with the content of the first channel 273a was obtained identifying locations of media segments of the first channel 273a. A key was obtained to access unprotected version of the content of the first channel 273a, e.g., according to a DRM session, and one or more segments of the media content may have been downloaded, decrypted, and possibly decoded. As illustrated, an eviction of the first channel 273a' disassociates and/or de-attaches the first channel 273a from the video player, unloads and/or otherwise deletes the associated manifest file, removes and/or otherwise deletes an associated DRM session, and unloads and/or otherwise deletes any downloaded segments not yet displayed.

The third channel 273c' is transitioned to a currently playing state according to the various embodiments disclosed herein, to access an associated manifest file, to establish a corresponding DRM session, to download one or more segments and to attach the channel 273c' to a video player, allowing the downloaded content to be decoded and/or otherwise rendered for presentation at the user display device. In the meantime, the second and fourth channels 273b', 273d' remain in warmed-up state, e.g., having obtained any required access authorization, having accessed their respective manifests, obtained their corresponding keys and established DRM sessions, and having processed any metadata as may be possible, short of attaching either of the warmed up channels 273b', 273d' and/or decoding and/or otherwise rendering the warmed up channels 273b', 273d' for display.

It is understood that some media channels may offer live content, such as live news broadcasts, sporting events, simulcast concerts and the like. Live media on such channels may processed and may be provided according to a streaming media protocol. Although the streaming presentation may be live or real time, there is typically at least a slight delay to account for any processing as may be necessary to prepare streaming versions of the live content. It is further understood that in at least some embodiments, a user may choose to pause a live streaming media, to rewind, to stop and/or to proceed at a later time, and quite possibly to fast-forward if doing so would not exceed the real-time presentation.

At least some service providers may offer such trick play features to live streaming feeds; however, doing so usually requires a second channel that provides access to a stored version of the live media presentation. The stored versions may begin substantially coincident with initiation of the live broadcast, and store the live media as it is streamed, e.g., until an end of the event. Accordingly, a viewer may choose to display the live media content, in which instance, the user's video player may obtain the streaming media from a live content source. However, should a user engage in a trick play feature, the user's video player may be adapted to automatically transition from the live content source to the recorded version available at a different content source, e.g., having a different manifest. Unfortunately, a transition from a live stream to a recorded version of the live stream would be subject to the same lag time as in a cold start. Beneficially, the techniques disclosed herein can be applied to such live stream sources, e.g., by automatically warming up the recorded version when a user selects the live stream. Then, should a user choose to engage in a trick play feature, the transition to the stored version would be expedited as the stored version of the live broadcast has already been warmed up.

FIG. 2H is a block diagram illustrating an example, non-limiting embodiment of a live media content item warm-up process 280. According to the example process 280, a stored version of a live media content item is warmed-up according to a play selection of a live media content item. A group of channels 281 includes a first channel 282a containing a streaming media of a live event, and a second, associated channel, 282b, providing a stored version of the live event, substantially up to a live progression of the live event. At a conclusion of the live event, the stored version may contain a recording of the entire live event. According to the illustrative example, the first channel 282a is in a play state in which the user's device presents a display of the live event feed. The second channel is in a warmed-up state concurrently with playback of the first channel 282a.

In more detail, a client 283 resident on the user device requests from a playback controller 284, playback of the first channel 282a to access a stream of the live event. The playback controller 284, in turn requests that the vide player initiate presentation of the live event via the first channel 282a. The video player 285, in turn, fetches the liven content from a live content source 286. The request obtains a manifest and subsequent request for successive segments according to the manifest. The fetched segments are processed, which includes decoding and/or rendering for display at a user display device. Having determined that the requested first channel 282a includes a live event, the client 283 may determine whether a stored version is available for trick play, and/or time shifted viewing. Having identified the second channel 282b as a source of a stored version of the live event, the client 283 may request the playback controller 284 to warm up the second channel 282b. The playback controller, in turn, initiates preparations, e.g., by requesting that the player 285 prepare the second channel according to a warmed-up state, without decoding and/or otherwise rendering content of the second channel, until such time as the second channel may be selected for playback. To this end, the playback controller 284 and/or the video player 285 fetch a manifest from a stored content source 287, performing any additional pre-processing as may be possible, without actually decoding and/or rendering the stored version for playback until such time as the second channel 282b may be selected for playback.

FIG. 2I is a block diagram illustrating an example, non-limiting embodiment of a live media content item warm-up process 280'. According to the example process 280', a live media content item is warmed-up according to a play selection of a corresponding stored portion of the live media content item. For example, having determined that a viewer has engaged in a trick play, e.g., a pause, rewind, and/or stop for playback at a later time, e.g., according to a time shifted presentation, the first channel 282a' providing the live content may be transitioned to a warm-up state. Such warming up of the live channel anticipates that a viewer may choose to return to the live feed at a later time, during the course of the live event. The second channel 282b' providing the stored version is then transitioned to a playback state, according to states of a revised group of channels 281'.

In more detail, the client 283 may initiate a seek to the past command, e.g., to review an already played segment of the live event. The playback controller 284 requests the player 285 to initiate playback from the stored channel 287. The video player fetches segments from the stored content source 287 and initiates playback according to the user's preference. There is no need for obtaining a manifest, establishing a DRM session, obtaining authorization, and the like, as the second channel has already been warmed up. By retaining the first channel in a warmed-up configuration, during playback of the stored version, the user may choose to return to live, e.g., by issuing from the client 283 to the playback controller 284 a play live command. The playback controller instructs the video player 285 to transfer playback to the first channel for the live content. The video player 285, in turn, fetches segments from the live source 286, processing the fetched live segments for playback.

In some embodiments, the warm-up functionality disclosed herein may be implemented in a video player. The video player may include a new video player configured with integrated warm-up functionality. Alternatively or in addition, the warm-up functionality may be added to an existing video player, such as an existing application level media player. For example, one or more modules of an open source video player, such as ExoPlayer, an application level media player for Android, may be modified to introduce one or more features directed to the warm-up functionality disclosed herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of systems 100, 220, 300 and processes 240, 250 presented in FIGS. 1, 2B, 2C, 2D and 3. For example, virtualized communication network 300 can facilitate in whole or in part a warming up of one or more media content items and/or channels or sources for playback, without attaching a video decoder and without actually decoding and/or otherwise rendering any of the warmed up media content, until such time as a user may choose to transition to a one or more of the warmed up media content items. Accordingly, the virtualized communication network may facilitate access to one or more service providers 170, content delivery networks 172 and/or content sources 175 and DRM servers 174. Access may be initiated by video players, e.g., via the media access 140, the wireless access 120 and/or the broadband access 110.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
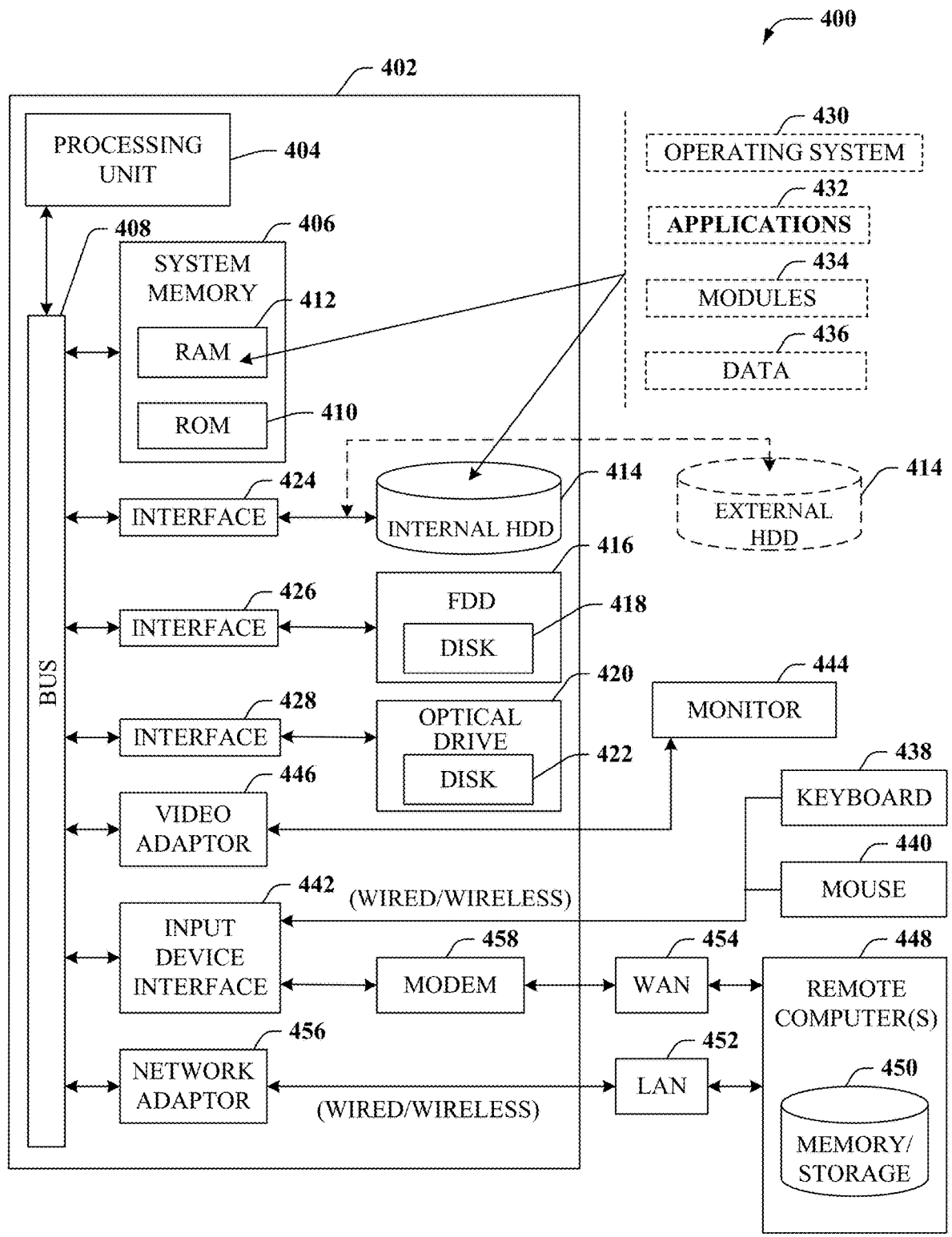
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a warming up of one or more media content items and/or channels or sources for playback, without attaching a video decoder and without actually decoding and/or otherwise rendering any of the warmed up media content, until such time as a user may choose to transition to a one or more of the warmed up media content items.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems. It is understood that in at least some embodiments the system 400, e.g., the applications 432, may facilitate in whole or in part a warming up of one or more media content items and/or channels or sources for playback, without attaching a video decoder and without actually decoding and/or otherwise rendering any of the warmed up media content, until such time as a user may choose to transition to a one or more of the warmed up media content items.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
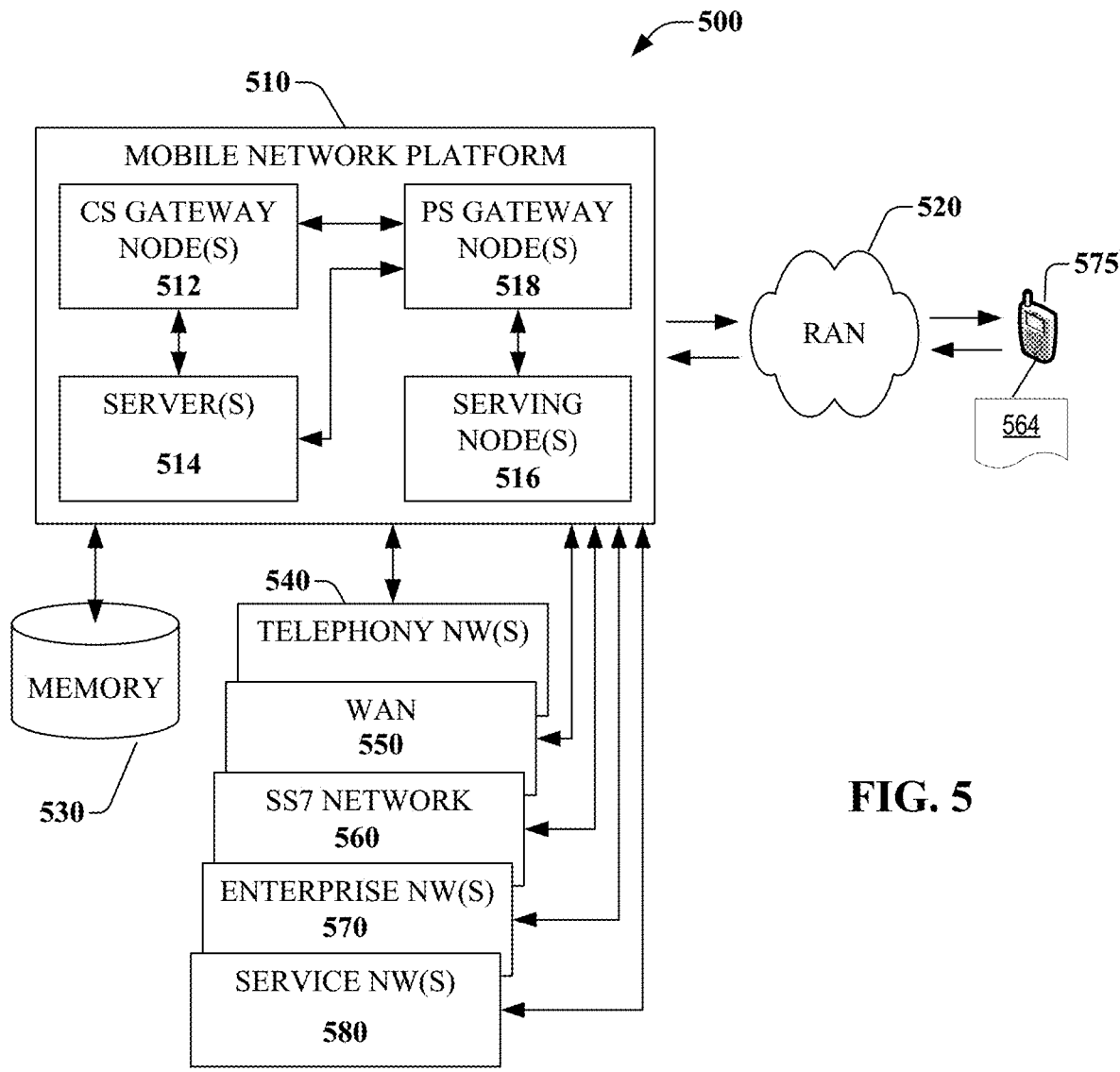
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a warming up of one or more media content items and/or channels or sources for playback, without attaching a video decoder and without actually decoding and/or otherwise rendering any of the warmed up media content, until such time as a user may choose to transition to a one or more of the warmed up media content items. Playback and/or warm-up may be accomplished at least in cooperation with a client app and/or a modified resident video player adapted to provide the warming-up functionality. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
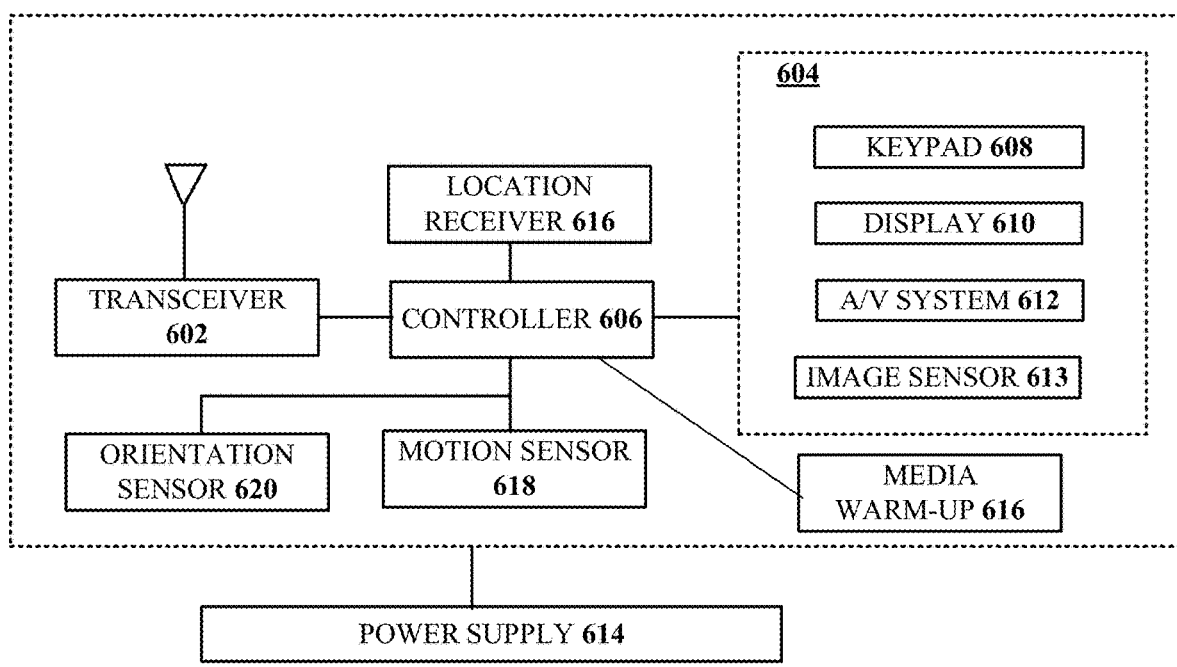
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a warming up of one or more media content items and/or channels or sources for playback, without attaching a video decoder and without actually decoding and/or otherwise rendering any of the warmed up media content, until such time as a user may choose to transition to a one or more of the warmed up media content items. For example, the communication device 600 may include a media warm-up module 616 adapted to facilitate a warming up of channels as disclosed herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A video player, comprising:
a processing system including a processor; and
a memory that stores executable instructions that, when executed by the processing system, facilitate performance of operations, the operations comprising:
identifying a plurality of unselected video files, wherein the identifying occurs while a video player is providing a first selected video file for presentation via a display device;
preconfiguring playback views for the plurality of unselected video files, while the video player is presenting the first selected video file;
preauthorizing access to the plurality of unselected video files, while the video player is presenting a first selected video file; and
fetching, while the video player is presenting a first selected video file, a plurality of manifests for the plurality of unselected video files, and a content license with key for the plurality of unselected video files,
wherein the identifying, the preconfiguring, the preauthorizing and the fetching occur without attaching a decoder of the video player to any of the unselected video files, and
wherein a subsequent selection of one of the plurality of unselected video files to obtain a second selected video file initiates an attaching of the second selected video file to the decoder of the video player and playback of the second selected video file, responsive to the subsequent selection, without repeating any of the preconfiguring, the preauthorizing, or the fetching the plurality of manifests and content license with key.

2. The video player of claim 1, wherein the preconfiguring of the playback views occurs without caching video content of the plurality of unselected video files.

3. The video player of claim 2, wherein the preauthorizing of the access to the plurality of unselected video files occurs without caching video content of the plurality of unselected video files.

4. The video player of claim 3, wherein the preauthorizing of the access to the plurality of unselected video files further comprises establishing a digital rights management session.

5. The video player of claim 4, wherein the operations further comprise obtaining an encryption key adapted to decrypt a video file of the plurality of unselected video files.

6. The video player of claim 3, wherein the fetching of the plurality of manifests for the plurality of unselected video files occurs continuously without caching video content of the unselected video files.

7. The video player of claim 1, wherein the plurality of unselected video files are protected according to digital rights management (DRM), the operations further comprise:
establishing a separate DRM session for each of the plurality of unselected video files.

8. A method, comprising:
identifying, by a processing system including a processor of a video player, a plurality of unselected video content, the unselected video content not yet having been selected for playback, wherein the identifying occurs while the video player is providing first selected video content for presentation via a display device;
preconfiguring, by the processing system, playback views for the plurality of unselected video content, while the video player is presenting the first selected video content;
preauthorizing, by the processing system, access to the plurality of unselected video content, while the video player is presenting a first selected video content; and
fetching, by the processing system and while the video player is presenting a first selected video content, a plurality of manifests for the plurality of unselected video content, and a content license with key for the plurality of unselected video content,
wherein the identifying, the preconfiguring, the preauthorizing and the fetching occur without attaching a decoder of the video player to any of the unselected video content, and
wherein a subsequent selection of one of the unselected video content to obtain a subsequently selected content item initiates an attaching of the decoder of the video player to the subsequently selected content item and playback of the subsequently selected content item responsive to the subsequent selection, without repeating any of the preconfiguring, the preauthorizing, and the fetching the plurality of manifests and the content license with key.

9. The method of claim 8, wherein the preconfiguring of the playback views occurs without caching video content of the unselected video content.

10. The method of claim 8, wherein the preauthorizing of the access to the plurality of unselected video content occurs without caching video content of the unselected video content.

11. The method of claim 8, wherein the fetching of the plurality of manifests for the plurality of unselected video content occurs without caching video content of the unselected video content.

12. The method of claim 8, wherein the preauthorizing of the access to the plurality of unselected video content further comprises:
fetching a content license; and
acquiring an encryption key, wherein the content license and the encryption key facilitate establishing a digital rights management session.

13. The method of claim 12, further comprising obtaining, by the processing system, an encryption key adapted to decrypt a video of the plurality of unselected video content.

14. A non-transitory, machine-readable medium, comprising executable instructions that, when executed by a processing system including a processor of a video player, facilitate performance of operations, the operations comprising:
identifying an unselected video program, the unselected video program not yet having been selected for playback by a media processor, wherein the identifying occurs while the media processor is providing a first selected video program for presentation via a display device;
preconfiguring a playback view for the unselected video program, while the media processor is providing the first selected video program for presentation;
preauthorizing access to the unselected video program, while the media processor is providing the first selected video program for presentation; and
fetching, while the media processor is providing the first selected video program for presentation, a manifest for the unselected video program, and a content license with key for the unselected video program,
wherein the identifying, the preconfiguring, the preauthorizing and the fetching occur without attaching a decoder of the video player to any of the unselected video program, and
wherein a subsequent selection of the unselected video program to obtain a subsequently selected content item initiates an attaching of the decoder of the video player to the subsequently selected content item and playback of the subsequently selected content item responsive to the subsequent selection, without repeating any of the preconfiguring, the preauthorizing, or the fetching the manifest and content license with key for the unselected video program.

15. The non-transitory, machine-readable medium of claim 14, wherein the preconfiguring of the playback view occurs without caching video content of the unselected video program.

16. The non-transitory, machine-readable medium of claim 14, wherein the preauthorizing of the access to the unselected video program occurs without caching video content of the unselected video program.

17. The non-transitory, machine-readable medium of claim 14, wherein the preauthorizing of the access to the unselected video program further comprises establishing a digital rights management session.

18. The non-transitory, machine-readable medium of claim 17, wherein the operations further comprise:
fetching a content license; and
obtaining an encryption key, wherein the content license and the encryption key facilitate establishing a digital rights management session for the unselected video program.

19. The non-transitory, machine-readable medium of claim 14, wherein the fetching of the manifest occurs continuously without caching video content of the unselected video program.

20. The video player of claim 1, wherein the identifying, the preconfiguring, the preauthorizing and the fetching occur without rendering any of the unselected video files.

* * * * *